(12) United States Patent
Koike

(10) Patent No.: US 9,769,716 B2
(45) Date of Patent: Sep. 19, 2017

(54) COMMUNICATION SYSTEM, METHOD OF HANDOVER AND BASE STATION

(71) Applicant: FUJITSU LIMITED, Kawasaki-shi, Kanagawa (JP)

(72) Inventor: Hitoshi Koike, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/090,087

(22) Filed: Apr. 4, 2016

(65) Prior Publication Data
US 2016/0309387 A1    Oct. 20, 2016

(30) Foreign Application Priority Data

Apr. 16, 2015  (JP) .................................. 2015-084179

(51) Int. Cl.
*H04W 36/00* (2009.01)
*H04W 92/20* (2009.01)
*H04W 84/04* (2009.01)

(52) U.S. Cl.
CPC ...... *H04W 36/0055* (2013.01); *H04W 84/045* (2013.01); *H04W 92/20* (2013.01)

(58) Field of Classification Search
CPC ............. H04W 36/24; H04W 36/0055; H04W 36/023; H04W 84/045; H04W 92/20
USPC .......................... 455/438, 436, 437, 439, 442
See application file for complete search history.

(56) References Cited

U.S. PATENT DOCUMENTS

| | | | | |
|---|---|---|---|---|
| 7,072,652 B2 * | 7/2006 | Stephens | ................ | H04W 36/26 455/424 |
| 7,680,081 B2 * | 3/2010 | Kamura | ................ | H04L 43/022 370/328 |
| 8,929,894 B2 * | 1/2015 | Catovic | ................ | H04W 36/30 370/216 |
| 9,253,696 B2 * | 2/2016 | Rubin | ..................... | G06F 11/00 |
| 9,451,530 B2 * | 9/2016 | Gunnarsson | .......... | H04W 92/20 |
| 2007/0249352 A1 * | 10/2007 | Song | ....................... | H04L 63/08 455/436 |
| 2009/0042597 A1 | 2/2009 | Yuuki | | |
| 2012/0094675 A1 | 4/2012 | Godin | | |
| 2013/0301611 A1 * | 11/2013 | Baghel | ................ | H04W 72/04 370/331 |

(Continued)

FOREIGN PATENT DOCUMENTS

| | | |
|---|---|---|
| JP | 2009-044336 A | 2/2009 |
| JP | 2012-531865 A | 12/2012 |

OTHER PUBLICATIONS

3rd Generation Partnership Project. 3GPP TS36.331 V12.4.1. Dec. 2014.

*Primary Examiner* — Marceau Milord
(74) *Attorney, Agent, or Firm* — Arent Fox LLP

(57) ABSTRACT

A communication system includes a control device, a first base station, and a second base station, wherein the first base station and the second base station are execute an S2 handover process, and after the S2 handover process, the first base station and the second base station execute an X2 handover process, the first base station transmits address information of the first base station to the second base station via the control device when the first base station executes the S2 handover process to the second base station, the second base station stores the received address information of the first base station, and transmits a connection request to the first base station based on the received address information of the first base station, and the first base station establishes a connection for the X2 handover process in response to the connection request.

20 Claims, 22 Drawing Sheets

(56) References Cited

U.S. PATENT DOCUMENTS

| | | | |
|---|---|---|---|
| 2014/0080484 A1* | 3/2014 | Centonza | H04W 76/045 455/436 |
| 2014/0376378 A1* | 12/2014 | Rubin | H04W 4/00 370/235 |
| 2015/0249950 A1* | 9/2015 | Teyeb | H04W 36/0016 455/437 |
| 2016/0036710 A1* | 2/2016 | Hanaoka | H04W 28/0284 370/235 |
| 2016/0142969 A1* | 5/2016 | Hedman | H04W 36/0022 370/331 |
| 2016/0277981 A1* | 9/2016 | Sunell | H04W 36/005 |

* cited by examiner

FIG. 4

Table 30:

| GLOBAL ENB ID | | IP ADDRESS | NUMBER OF TIMES OF HOs | | RSRP | X2 CONNECTION DETERMINATION |
|---|---|---|---|---|---|---|
| PLMN | CGI | | Inband | Outband | | |
| 33f008 | 4f0002 | 10.34.5.2 | 20 | 30 | -60 | 1※ |
| 33f008 | 4f0003 | 10.34.5.3 | 40 | 20 | -65 | 1※ |
| 33f008 | 5c1234 | 10.34.7.4 | 2 | 1 | -105 | 0※ |
| 33f008 | 3a2244 | 10.34.9.2 | 10 | 10 | -65 | 0※ |

Table 31:

| GLOBAL ENB ID | | IP ADDRESS |
|---|---|---|
| PLMN | CGI | |
| 33f008 | 4f0001 | 10.34.5.1 |

※NOT COUPLED: "0" COUPLED: "1"

FIG. 7

| GLOBAL ENB ID | | IP ADDRESS | NUMBER OF TIMES OF HOs | | RSRP | X2 CONNECTION DETERMINATION |
|---|---|---|---|---|---|---|
| PLMN | CGI | | Inband | Outband | | |
| 33f008 | 4f0002 | 0.0.0.0 | 0 | 0 | -65 | 0※ |
| 33f008 | 4f0003 | 0.0.0.0 | 0 | 0 | -70 | 0※ |
| 33f008 | 5c1234 | 0.0.0.0 | 0 | 0 | -120 | 0※ |
| 44f009 | 3a2244 | 0.0.0.0 | | | -70 | 0※ |

30

※NOT COUPLED: "0" COUPLED: "1"

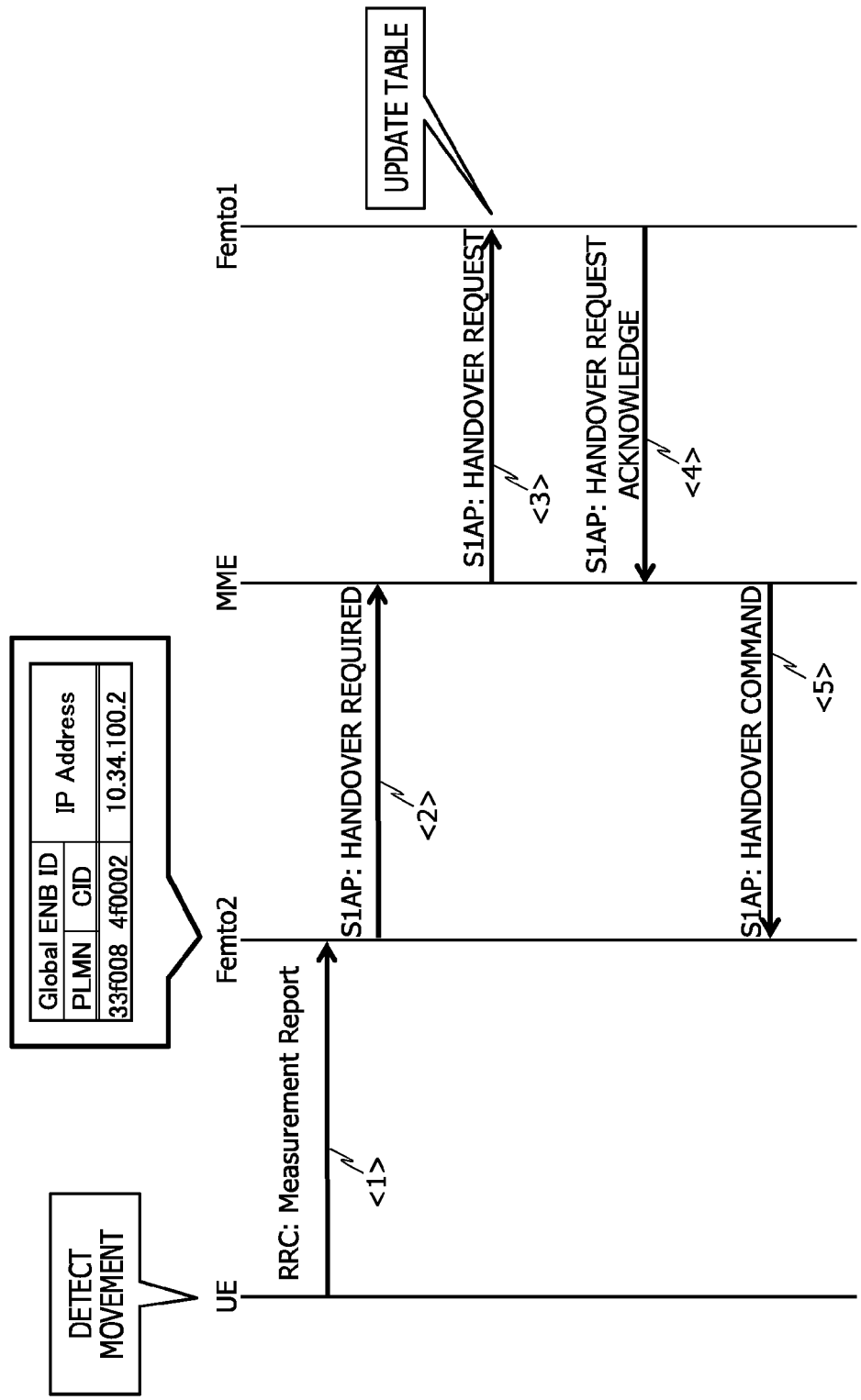

FIG. 9B

| UE History Information | | | | | | |
|---|---|---|---|---|---|---|
| Last Visited Cell List | | | | | | |
| | Choice Last Visited Cell Information | | | | | |
| | | Last Visited E-UTRAN Cell Information | | | | |
| | | | Global Cell ID | | | |
| | | | | PLMN Identity | | |
| | | | | | PLMN identity | |
| | | | | Cell Identity | | |
| | | | Cell Type | | | |
| | | | Time UE stayed in Cell | | | |
| | | | eNB IP Address | | | |

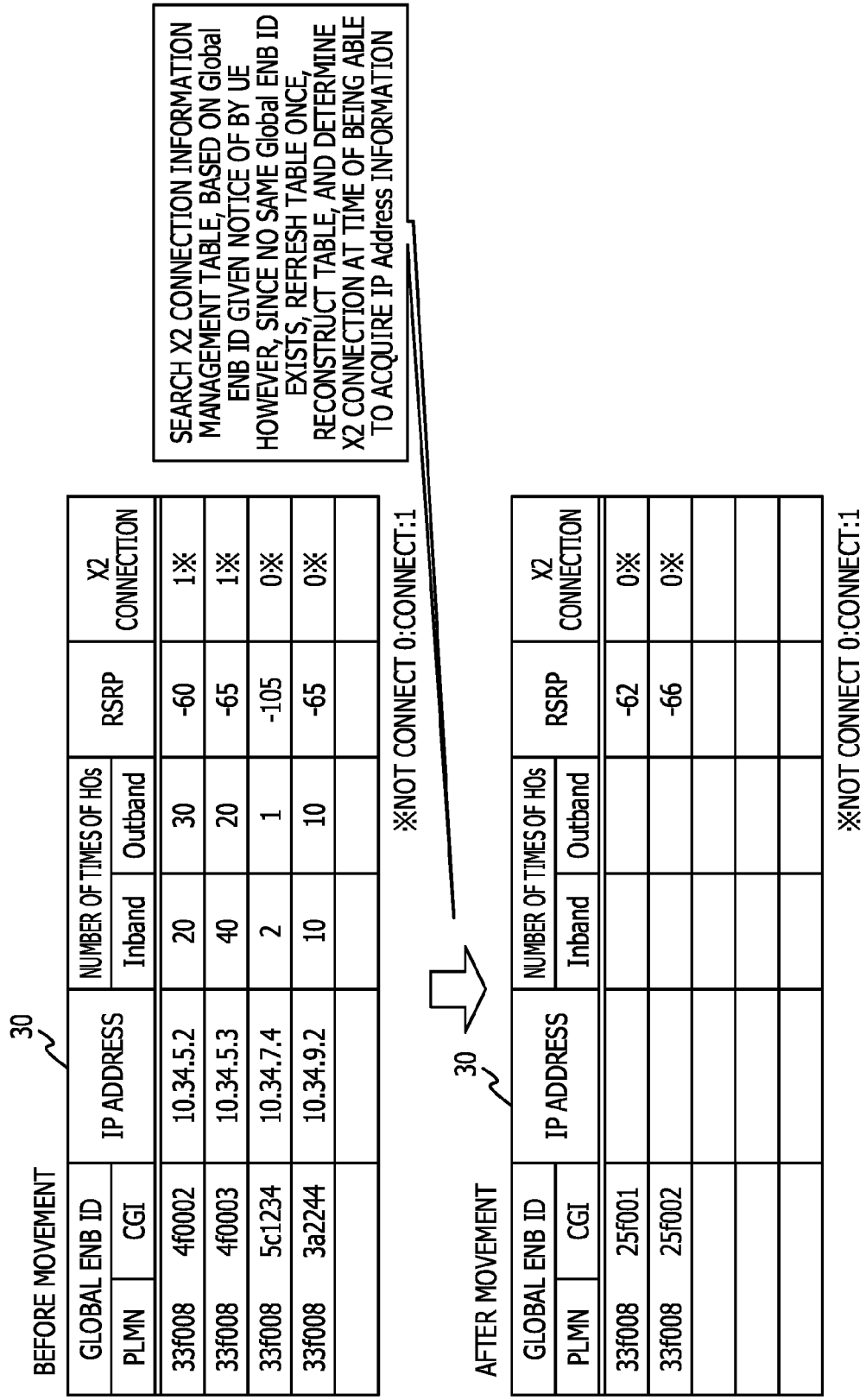

COMMUNICATION SYSTEM, METHOD OF HANDOVER AND BASE STATION

CROSS-REFERENCE TO RELATED APPLICATION

This application is based upon and claims the benefit of priority of the prior Japanese Patent Application No. 2015-084179, filed on Apr. 16, 2015, the entire contents of which are incorporated herein by reference.

FIELD

The embodiment discussed herein is related to a communication system, a method of handover, and a base station.

BACKGROUND

As one of standards of communication systems for providing mobile communication services, long term evolution (LTE) is known. A network related to LTE includes a core network and a wireless network. The wireless network is formed by wireless base stations (each expressed as an "eNB": hereinafter, also each expressed as a "base station") directly coupled to the core network.

Each of the base stations is coupled to a control device (mobility management entity: MME) of a base station forming the core network, via an interface called an S1 interface. In addition, base stations are coupled to each other via an interface called an X2 interface. As methods used by a terminal under control of a base station for being handed over to a cell (adjacent cell) generated by a base station (adjacent base station) adjacent to another base station, there are two methods. One is a handover performed via the MME serving as a control device of the base station and is called an S1 handover. The other is a handover performed directly (via no MME) between base stations and is called an X2 handover.

In recent years, the popularization of smartphones or the like causes a traffic amount to rapidly increase. In order to secure a communication capacity corresponding to a demand for a traffic amount, installation of a small-size base station whose transmission power is smaller than an existing base station is considered. The small-size base station is called a femto base station, and a cell formed by the femto base station is called a femtocell. The cell radius of the femtocell is smaller than that of a cell formed by the existing base station. Therefore, the existing base station is called a macro base station, and a cell formed by the macro base station is called a macrocell. The femtocell is locally installed in a private house, an office, a shop, or the like and is coupled to the core network via an access network. The femto base station is also called a "Home eNB".

In a case where the macro base station is installed, the environment of an installation location is researched in advance, and the information of an adjacent cell is registered as system data of the macro base station. In installation of the femto base station, the detailed information of an adjacent cell may be added to, for example, configuration information of a network, called configuration management (CM) data.

However, the femto base station has portability, and a network environment surrounding the femto base station fluctuates in accordance with an installation location. Therefore, in the femto base station, minimum information is statically set as the CM data, and unconfigured information is collected from an adjacent cell or a wireless terminal (called a user equipment (UE): hereinafter, also expressed as a "terminal").

As examples of the related art, Japanese Laid-open Patent Publication No. 2009-044336, Japanese National Publication of International Patent Application No. 2012-531865, and, 3GPP TS 36.331 v 12.4.1 (2014-12), 6.3.1 are known.

SUMMARY

According to an aspect of the invention, a communication system includes a control device, a first base station, and a second base station, wherein the first base station and the second base station are configured to execute a first handover process in which the first base station and the second base station execute handover between the first base station and the second base station through the control device, and after the first handover process, the first base station and the second base station are configured to execute a second handover process between the first base station and the second base station in which the first base station and the second base station execute the handover without involving the control device, the first base station includes a first memory and a first processor coupled to the first memory and configured to transmit address information of the first base station to the control device when the first base station executes the first handover process to the second base station, the control device is configured to transmit the address information of the first base station to the second base station in the first handover process, the second base station includes a second memory configured to store the received address information of the first base station, and a second processor coupled to the second memory and configured to transmit a connection request to the first base station based on the received address information of the first base station, and the first base station is configured to establish a connection for the second handover process between the first base station and the second base station in response to the connection request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates examples of a management table of X2 connection information and self-station information;

FIG. 7 illustrates registration contents of the management table in the first phase;

FIG. 9A is an explanatory diagram of the second phase of the first example of an operation;

FIG. 9B illustrates an example of a data structure of UE History Information included in a Handover Required message illustrated in FIG. 9A;

FIGS. 18A and 18B are an explanatory diagram of the fourth example of an operation and illustrate a case where the base station moves from the current installation location to a location far away therefrom.

DESCRIPTION OF EMBODIMENT

Figure 1:
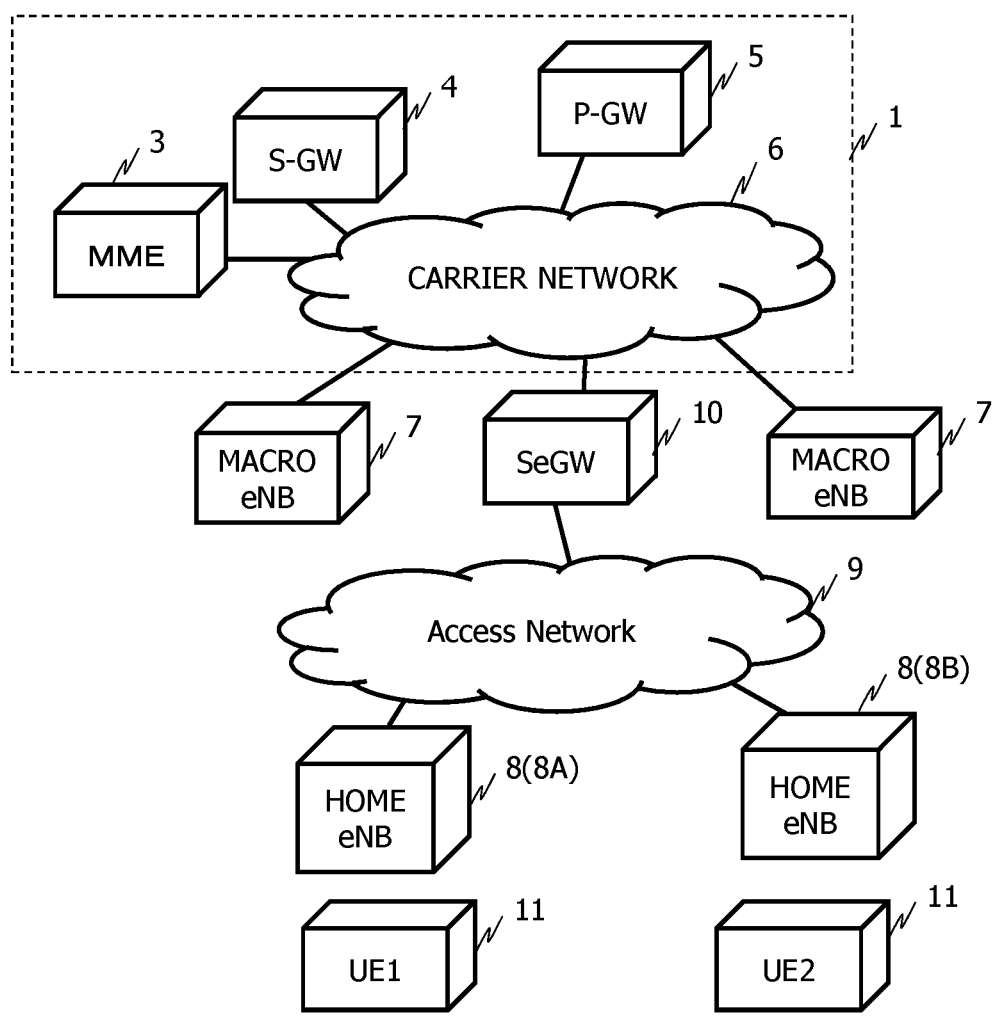
FIG. 1 illustrates an example of a configuration of a communication system (network system) according to an embodiment.

The information of the adjacent cell, obtained from the adjacent cell or the terminal, does not include such information as the address of an adjacent base station, used for establishing a connection with the adjacent base station. In addition, the CM data statically set in the femto base station does not include information used for establishing a connection. Therefore, it is practically difficult for the femto base station to perform the X2 handover.

An object of one aspect of the present technology is to provide a technology for enabling to establish a connection available for performing a handover between base stations.

Hereinafter, an embodiment will be described with reference to drawings. The configurations of the embodiment are exemplified, and an embodiment is not limited to the configurations of the embodiment.

In the embodiment, the following communication system will be described. The communication system includes a first base station and a second base station, each of which is a femto base station. In a case where the S1 handover in which a terminal moves from the first base station to the second base station is implemented, the first base station, which is a base station (source base station) serving as a handover source, transmits the IP address of the first base station to an MME while putting the IP address of the first base station on a handover message. The IP address is put on, for example, UE History Information. The MME transmits the handover message including the IP address to the second base station, which is a base station (target base station) serving as a handover destination. The target base station stores, in a management table, the IP address of the first base station, included in the handover message received from the MME, and the identifier (for example, a Global ENB ID) of an adjacent cell.

By using the management table, the second base station measures the number of times handovers (also expressed as "HO") between the first base station and the second base station are generated (the frequency of handovers (a HO frequency)) and reference signal received power (RSRP) in a predetermined time period, and the second base station stores results of the measurement in the management. The RSRP is a value indicating a reception level (reception intensity) of a reference signal (Reference Signal) transmitted by a base station 8. In a case where at least one of the HO frequency and the RSRP exceeds a threshold value (reaches a predetermined range), the second base station establishes, by using the IP address of the first base station, a connection (called an "X2 connection") with the first base station, available for the X2 handover. By using the X2 connection, it is possible for the first base station and the second base station to perform the X2 handover. In addition, in a case where at least one or the two of the frequency and the RSRP in the predetermined time period fall below the respective threshold values, the connection (X2 connection) is disconnected.

<Network Configuration>

FIG. 1 illustrates an example of a configuration of the communication system according to the embodiment. In the example of FIG. 1, a network includes a core network 1 and a wireless network 2 coupled to the core network 1. The core network 1 includes an MME 3, a serving gateway (S-GW) 4, and a packet data network gateway (P-GW) 5. The MME 3, the S-GW 4, and the P-GW 5 are coupled by a carrier network 6.

The MME 3 is an access gateway in a C-plane, which handles network control, and performs sequence control, handover control, location management at a standby time of a terminal (location registration of a terminal), a calling (paging) for a base station at the time of receiving a call, authentication of a terminal (non access stratum (NAS)), and so forth. The S-GW 4 is a gateway, which handles user data (user packets), and transfers user data of LTE to the P-GW 5. The P-GW 5 is a gateway used for coupling the user packets to an external network such as the Internet or an intranet. The MME 3 is an example of a "control device" of a base station.

The wireless network 2 includes macro base stations 7, coupled to the carrier network 6, and base stations 8 each serving as the femto base station (Home eNB). In the example of FIG. 1, as the base stations 8, a base station 8A and a base station 8B are coupled to the carrier network 6 via an access network 9 and a security gateway (SeGW) 10. In the following explanation, in a case of indicating the femto base stations without distinction, expressions of "base stations 8" or "femto base stations 8" are used.

Each of the base stations 8 is coupled to the MME 3 via the S1 interface. In addition, between each of the base stations 8 and the S-GW 4, a path (bearer) used for transferring user packets is established. Each of terminals (UE) 11 under control of the base stations 8 is able to transmit and receive user packets by using a wireless bearer established with the corresponding base station 8.

The base stations 8 each form a cell (femtocell) having a cell radius smaller than those of cells (macrocells) formed by the macro base stations 7. The cell of the base station 8A and the cell of the base station 8B each form an adjacent cell in which the terminals 11 are able to be handed over between the cells.

Note that the base stations 8 (femto base stations) are examples of base stations (called small base stations or small-size base stations) that each form a cell whose cell radius smaller than those of the macrocells and that each have portability. The concept of small base stations includes the femto base stations, pico base stations that each form a picocell, and the small base stations that each form a cell whose cell radius is larger than that of the femtocell and is smaller than that of the macrocell.

<Configuration of Femto Base Station>

Figure 2:
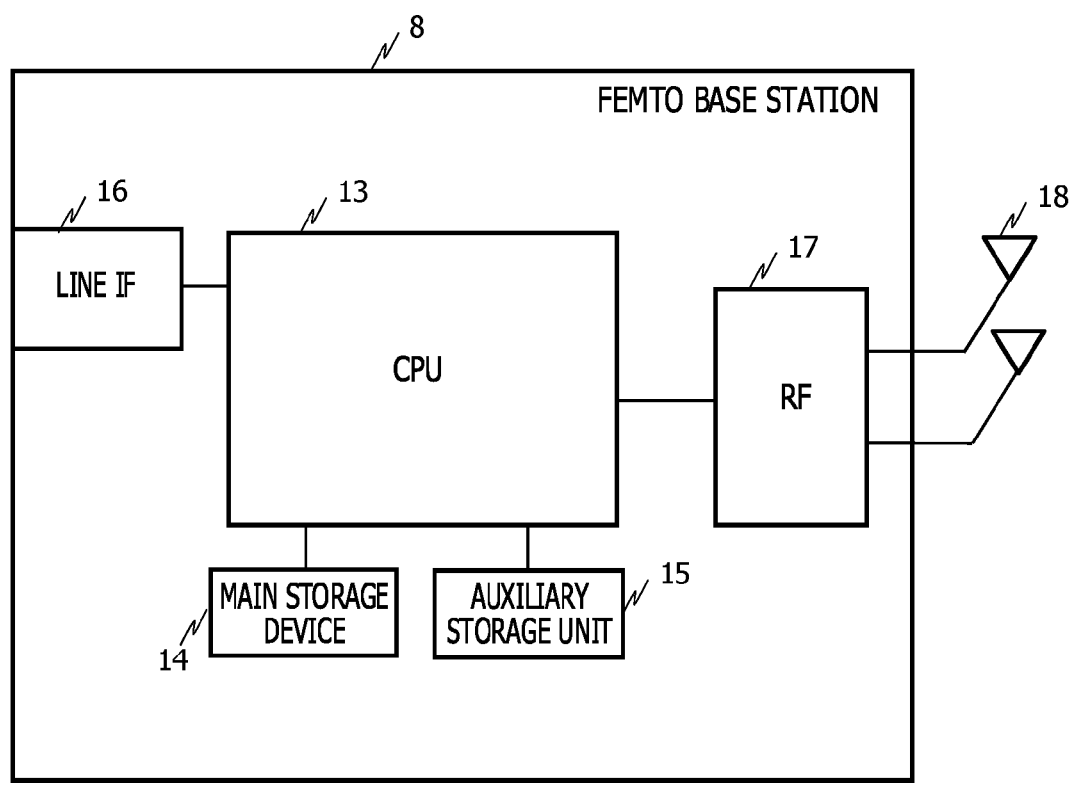
FIG. 2 illustrates an example of a configuration of hardware of a femto base station.

FIG. 2 illustrates an example of a configuration of hardware of a femto base station. In FIG. 2, the base stations 8 each include a central processing unit (CPU) 13, a main storage device 14 coupled to the CPU 13, an auxiliary storage device 15, a line interface (line IF) 16, and a radio frequency (RF) circuit 17. An antenna 18 is coupled to the RF circuit 17.

The main storage device 14 is used as a working area of the CPU, an execution area of a program, and a buffer area of data. The main storage device 14 is formed by, for example, a random access memory (RAM) or a combination of the RAM and a read only memory (ROM).

The auxiliary storage device 15 stores therein a program executed by the CPU 13 and data used at the time of executing the program. The auxiliary storage device 15 is formed by at least one of non-volatile storage media. As the non-volatile storage medium, at least one of a flash memory, a hard disk, a solid state drive (SSD), and an electrically erasable programmable read-only memory (EEPROM) may be selected.

The line IF 16 is formed by using, for example, a local area network (LAN) card or a network interface card (NIC). The line IF 16 contains a physical line coupled to the access network 9. An S1 line and an X2 line are provided on the physical line. Transmission and reception of messages are performed with the MME 3 or an adjacent base station by using the line IF 16.

The RF circuit 17 converts, into an RF signal (radio wave), a baseband signal generated by the CPU 13 and radiates the RF signal (radio wave) from the antenna 18. In addition, an RF signal (radio wave) received by the antenna 18 is converted into a baseband signal by the RF circuit 17 and input to the CPU 13.

The CPU 13 loads, into the main storage device 14, and executes a program stored in the auxiliary storage device 15. From this, the CPU 13 performs various processing operations. At least some of the processing operations performed by the CPU 13 may be performed by a digital signal processor (DSP). Alternatively, at least some of the processing operations may be performed by a programmable logic device (PLD) such as a field programmable gate array or a semiconductor device such as an integrated circuit (an IC, a LSI, or an application specific integrated circuit (ASIC)). The CPU 13 is an example of a "processor", a "(first or second) control device" or a "controller". Each of the main storage device 14 and the auxiliary storage device 15 is an example of a "storage device" or a "memory".

Figure 3:
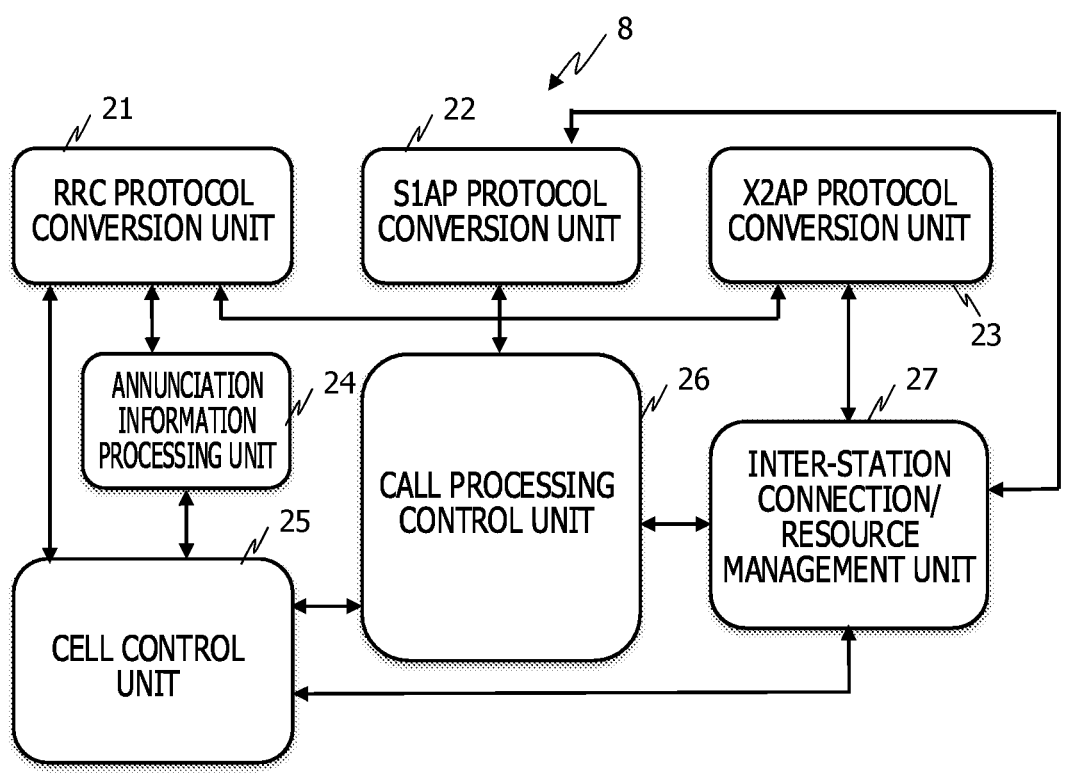
FIG. 3 is an explanatory diagram of functions included in the femto base station.

FIG. 3 is an explanatory diagram of functions included in a femto base station. By executing a program, each of the femto base stations 8 operates as a device including an RRC protocol conversion unit 21, an S1AP protocol conversion unit 22, an X2AP protocol conversion unit 23, an annunciation information processing unit 24, a cell control unit 25, a call processing control unit 26, and an inter-station connection/resource management unit 27.

The RRC protocol conversion unit 21 (hereinafter, expressed as a "protocol conversion unit 21") performs encoding and decoding of a radio resource control (RRC: radio resource control) protocol. An RRC layer manages control of a terminal, such as annunciation information, paging, an RRC connection (a wireless link connection with a terminal), radio bearer management, and mobility.

The S1AP protocol conversion unit 22 (hereinafter, expressed as a "protocol conversion unit 22") performs encoding and decoding of an S1 application protocol (S1AP) serving as a protocol used for communication between the base station and the MME 3. The X2AP protocol conversion unit 23 (hereinafter, expressed as a "protocol conversion unit 23") performs encoding and decoding of an X2 Application Protocol (X2AP) serving as a protocol used for communication between base stations.

The annunciation information processing unit 24 performs processing for transmitting (announcing) annunciation information (system information related to a base station) to a cell. The cell control unit 25 controls a setting and management of a cell. The call processing control unit 26 performs call processing in units of users (terminals). The inter-station connection/resource management unit 27 performs a setting and management of an inter-station link.

Data management and processing according to the embodiment are performed by the inter-station connection/resource management unit 27 (hereinafter, expressed as a "management unit 27"). The management unit 27 acquires pieces of information (pieces of information included in Measurement Report and Handover Request) obtained by processing operations in the protocol conversion units 21 and 22. In addition, the management unit 27 acquires adjacent cell information held by the call processing control unit 26. The management unit 27 performs generation of a management table of X2 connection information and X2 connection processing.

<X2 Connection Information Management Table>

FIG. 4 illustrates examples of a management table 30 of the X2 connection information and a self-station information 31. The management table 30 and the self-station information 31 are stored in, for example, at least one of the main storage device 14 and the auxiliary storage device 15.

The management table 30 stores therein "Global ENB IDs" serving as identifiers of the base stations 8 (adjacent base stations) and the IP addresses of the base stations 8 while associating the "Global ENB IDs" and the IP addresses of the base stations 8 with each other. In a message received by one of the base stations 8, such as Measurement Report or Handover Request, the corresponding base station 8 (adjacent base station) is identified by the corresponding Global ENB ID. Therefore, in order to identify the IP address of one of the base stations 8 to which an IP address corresponds, associating with the Global ENB ID is suitable. Note that the Global ENB ID is a combination of a public land mobile network number (PLMN) serving as a public mobile phone network number and a cell global identify (CGI) serving as a cell identifier. In the following explanation, in some cases, an expression of an "adjacent cell" is used to refer to an adjacent base station.

The management table 30 further stores therein the number of times of handovers (HOs) (the frequency of HOs) with the adjacent base station in a predetermined time period. Handovers include an inbound handover, in which the corresponding terminal 11 moves from an adjacent base station to the self-station, and an outbound handover in which the corresponding terminal 11 moves from the self-station to the adjacent base station. For each of adjacent cells, the management table 30 stores therein the number of times of inbound handovers and the number of times of outbound handovers. Furthermore, the management table 30 stores therein an RSRP value of each of adjacent cells. As the RSRP value, for example, the moving average of the RSRP in a predetermined time period is used. In this regard, however, a value other than the moving average may be used. Furthermore, the management table 30 is able to store therein, for each of adjacent bases, a value (an X2 connection determination value) indicating whether or not being in a state of the X2 connection. In the example of FIG. 4, the X2 connection determination value of "1" means an X2 connection state, and the X2 connection determination value of "0" means a state of not being subjected to the X2 connection (a state of being subjected to no connection).

As the self-station information 31, the Global ENB ID and the IP address of the corresponding base station 8 itself are stored while being associated with each other. The self-station information 31 is statically set in the corresponding base station 8. In contrast, information registered in the management table 30 is created based on information received by the corresponding base station 8.

First Example of Operation

Figure 5:
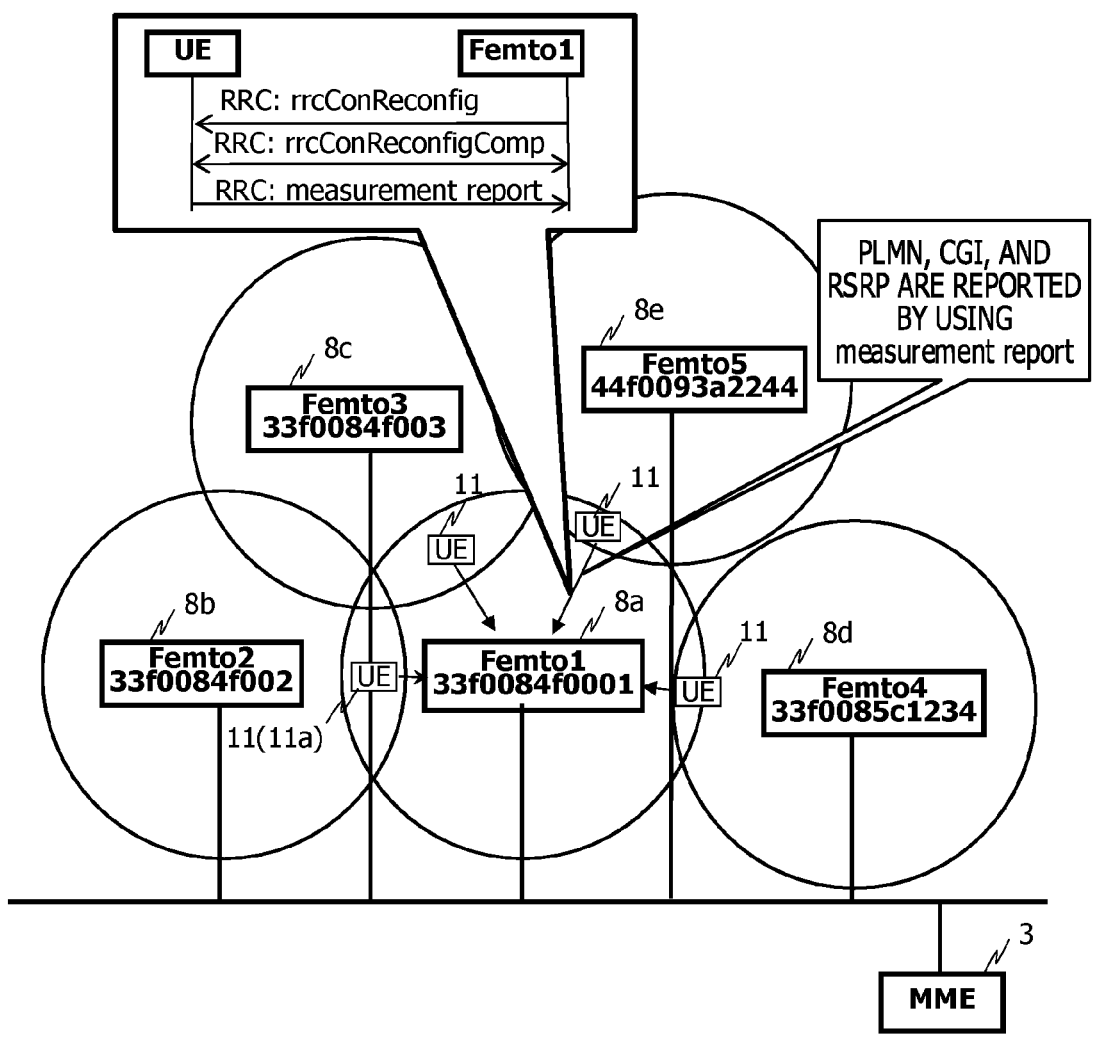
FIG. 5 is an explanatory diagram of a first example of an operation in a communication system.

FIG. 5 is an explanatory diagram of a first example of an operation in a communication system. In FIG. 5, base stations 8a, 8b, 8c, 8d, and 8e (Femto1, Femto2, Femto3, Femto4, and Femto5) serving as femto base stations are illustrated. The base stations 8b to 8e each form an adjacent cell of a cell of the base station 8a.

<First Phase>

If a power supply of the base station 8a is turned on, the base station 8a forms the cell. The terminals (UE) 11 that enter the cell each perform a procedure for establishing an RRC connection (a wireless link) and is wirelessly coupled to the base station 8a. Then, the base station 8a transmits, to each of the terminals 11, a transmission request message (rrc Connection Reconfiguraiton) for requesting transmission of a measurement report message (Measurement Report).

Figure 6:
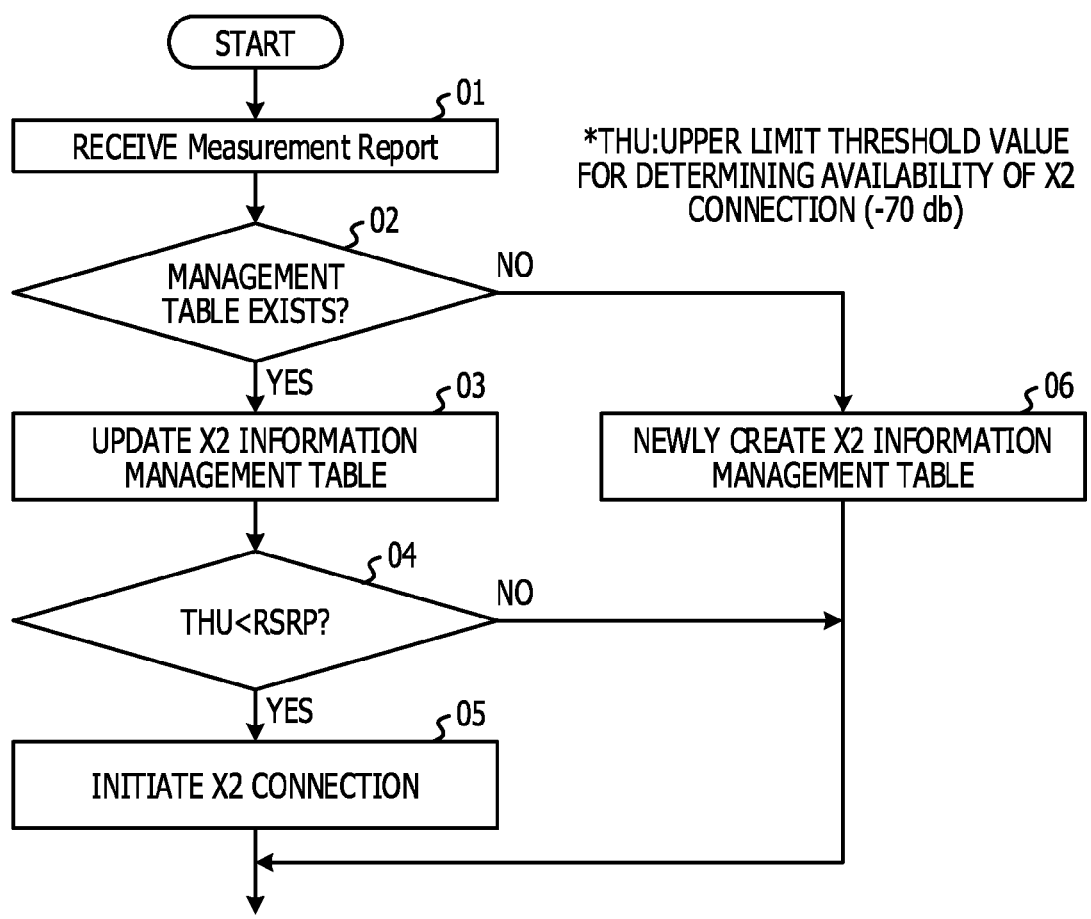
FIG. 6 is a flowchart illustrating an example of processing according to a first phase of the first example of an operation.

Each of the terminals 11, which receives the transmission request message, transmits Measurement Report to the base station 8a. FIG. 6 is a flowchart illustrating an example of processing according to a first phase of the first example of an operation. The processing in FIG. 6 is performed by the CPU 13 (the management unit 27).

The base station 8a receives Measurement Report ("01"). Then, the base station 8a determines whether or not the management table 30 is stored in, for example, the auxiliary storage device 15 ("02"). If the management table 30 is not stored, the base station 8a creates the management table 30 on the main storage device 14 and stores the management table 30 in the auxiliary storage device 15 ("06"). Measurement Report includes the Global ENB ID and the RSRP of the corresponding one of the individual adjacent base stations. The base station 8a registers, in an empty entry of the management table 30, the Global ENB ID and the RSRP of the corresponding one of the individual adjacent base stations, included in Measurement Report. In a case where Measurement Report includes information of adjacent base stations, the entries of the respective adjacent base stations are registered in the management table 30. Note that the management table 30 is saved (backed up) in the auxiliary storage device 15 every time the X2 connection determination value is updated.

In a case where the management table 30 exists in the processing operation in "02" ("02": Yes), the management table 30 is updated by using information included in Measurement Report ("03"). At this time, if an corresponding to the Global ENB ID (an adjacent base station) included in Measurement Report is not registered in the management table 30, a new entry including the relevant Global ENB ID is registered, and the RSRP value is updated. In a case where an entry of the corresponding Global ENB ID already exists in the management table 30, the RSRP value of the relevant entry is updated.

In a processing operation in "04", the base station 8a determines whether or not the updated RSRP value exceeds an upper limit threshold value (THU) used for determining availability of the X2 connection. At this time, in a case where the RSRP value does not exceed the threshold value ("04": No), nothing is perform. In contrast, in a case where the RSRP value exceeds the threshold value ("04": Yes), the X2 connection with an adjacent base station identified by the Global ENB ID of the relevant entry is initiated ("05"). Note that the determination processing in "04" may be determination of whether or not being greater than or equal to the upper limit threshold value.

Measurement Report does not include the IP address of the corresponding base station 8. Therefore, no IP address is registered in an entry registered at a point of time when the management table 30 is newly created. Accordingly, as exemplified in FIG. 7, in the management table 30, the Global ENB ID (PLMN+CGI) and the RSRP value are registered in an entry of each of the adjacent base stations (base stations 8b to 8e) reported by Measurement Reports form the respective terminals 11. However, each of the IP addresses is in a state of being unregistered. In addition, as each of the X2 connection determination values, "0" is set.

<Second Phase>

Figure 8:
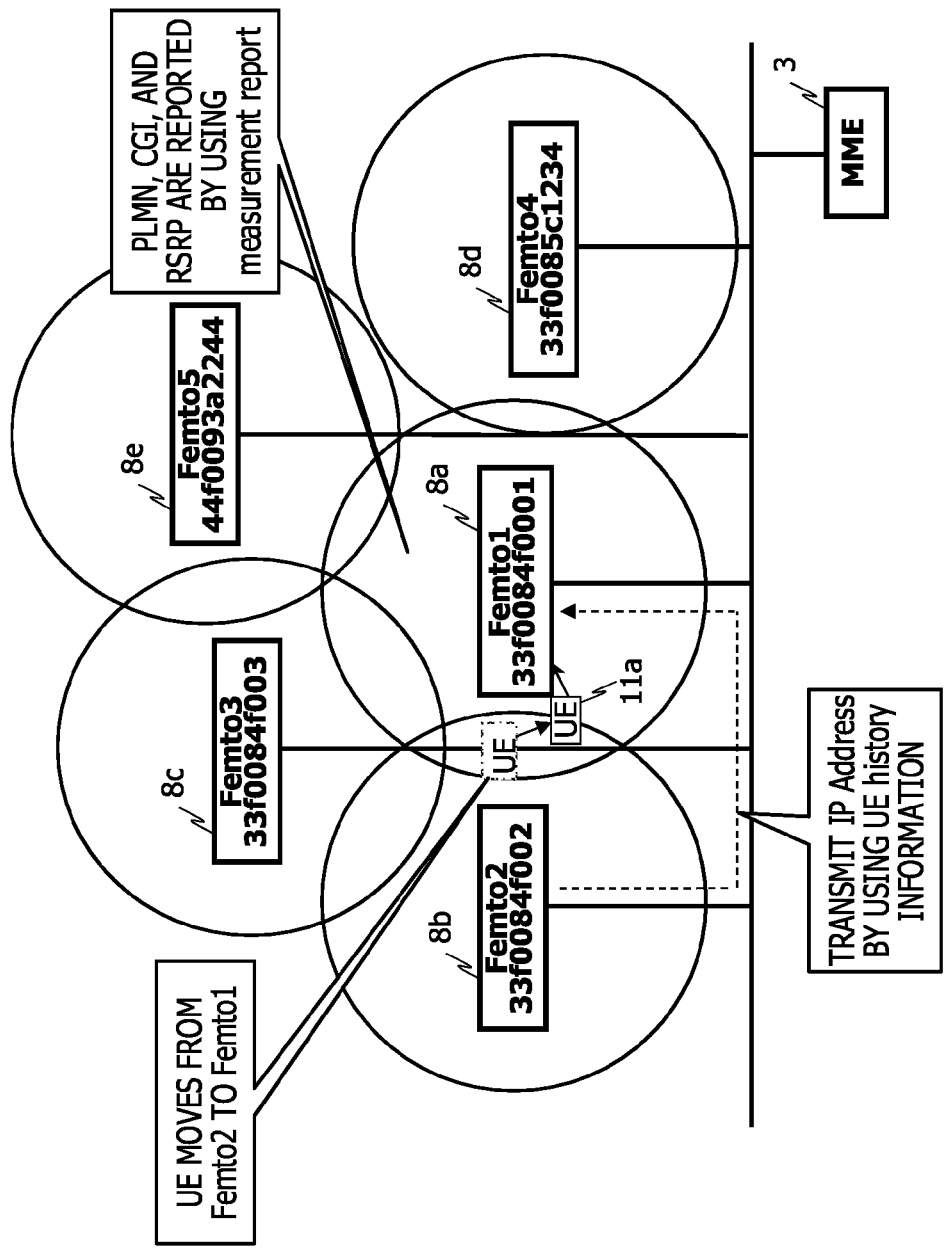
FIG. 8 is an explanatory diagram of a second phase of the first example of an operation.
Figure 9C:
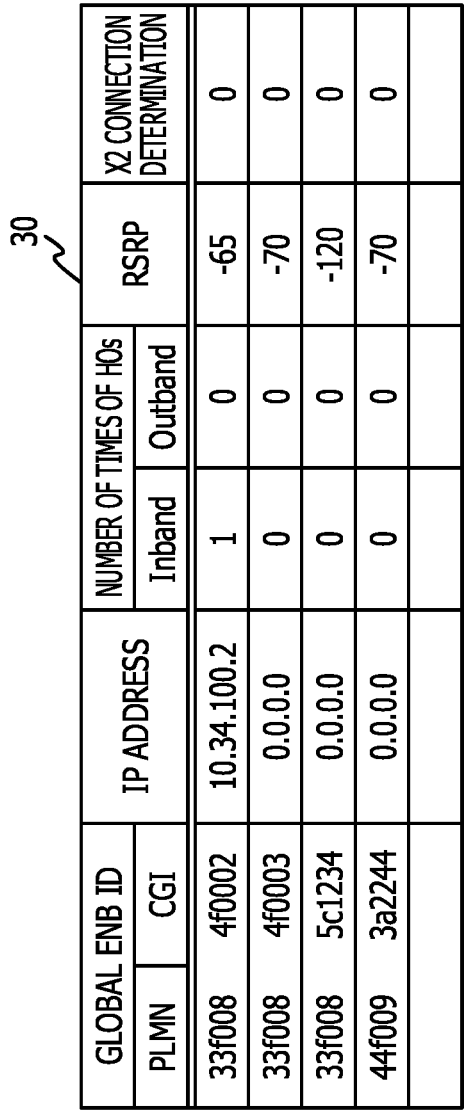
FIG. 9C illustrates examples of contents (adjacent Femto information (adjacent base station information)) of the management table, updated by a base station that receives the Handover Request message illustrated in FIG. 9A.

FIG. 8, FIG. 9A, FIG. 9B, and FIG. 9C are explanatory diagrams of a second phase of the first example of an operation. As illustrated in FIG. 8, a case where one of the terminals 11 (assumed to be the terminal 11a) under control of the base station 8b serving as an adjacent base station of the base station 8a moves from the base station 8b to the base station 8a is assumed. In this case, the terminal 11a transmits Measurement Report to the base station 8b (<1> in FIG. 9A). In this Measurement Report, it is reported to the base station 8b that the reception level (reception intensity) of a radio wave from the base station 8b is decreased while the reception level (reception intensity) of a radio wave from the base station 8a is increased. The Global ENB ID of the base station 8b is, for example, "PLMN=33f008" and "CID=4f0002", and the IP address thereof is, for example, "10.34.100.2".

The base station 8b becomes a source base station, and in order to hand over the terminal 11a to a target base station (the base station 8a), the S1 handover is performed by the following procedure. The base station 8b transmits, to the MME 3, a request message (Handover Required) for a handover (<2> in FIG. 9A). The MME 3 transmits, to the base station 8a, a request message (Handover Request) for a handover, which includes information included in Handover Required (<3> in FIG. 9A). Handover Request is received by the base station 8a. The base station 8a performs predetermined processing aimed at a handover and transmits, to the MME 3, a response message (Handover Request Acknowledge) (<4> in FIG. 9A). The MME 3 transmits a response message (Handover command) to the base station 8b (<5> in FIG. 9A). Via such a procedure, the terminal 11a moves to the base station 8a.

The message, "Handover Required", includes a field called UE history information (see FIG. 9B). The base station 8b adds the IP address of the station itself (see "eNB IP Address" in FIG. 9B), as optional information to be stored in the UE history information. The MME 3 transmits, to the base station 8a, Handover Request including the UE history information received from the base station 8b.

In a case where the IP address is set in the UE History Information in Handover Request, the base station 8*a*, which receives Handover Request, registers the relevant IP address in the management table 30. The UE History Information includes the Global ENB ID of the base station 8*b*. Therefore, based on the Global ENB ID, the base station 8*a* searches, within the management table 30, for an entry corresponding to the base station 8*b* and registers the IP address of the base station 8*b* in the searched entry (see FIG. 9C). At this time, the base station 8*a* counts up (adds "1" to) the number of times of inbound handovers (IHOs) regarding the entry corresponding to the base station 8*b*. Note that, as for the relevant entry, in a case where an outbound handover (OHO) from the base station 8*a* to the base station 8*b* is performed, "1" is added to the number of times of OHOs.

In the above-mentioned example of an operation, the base station 8*b* is an example of a "first base station", and the base station 8*a* is an example of a "second base station". Each of Handover Required and Handover Request is an example of a "handover message".

Figure 10:
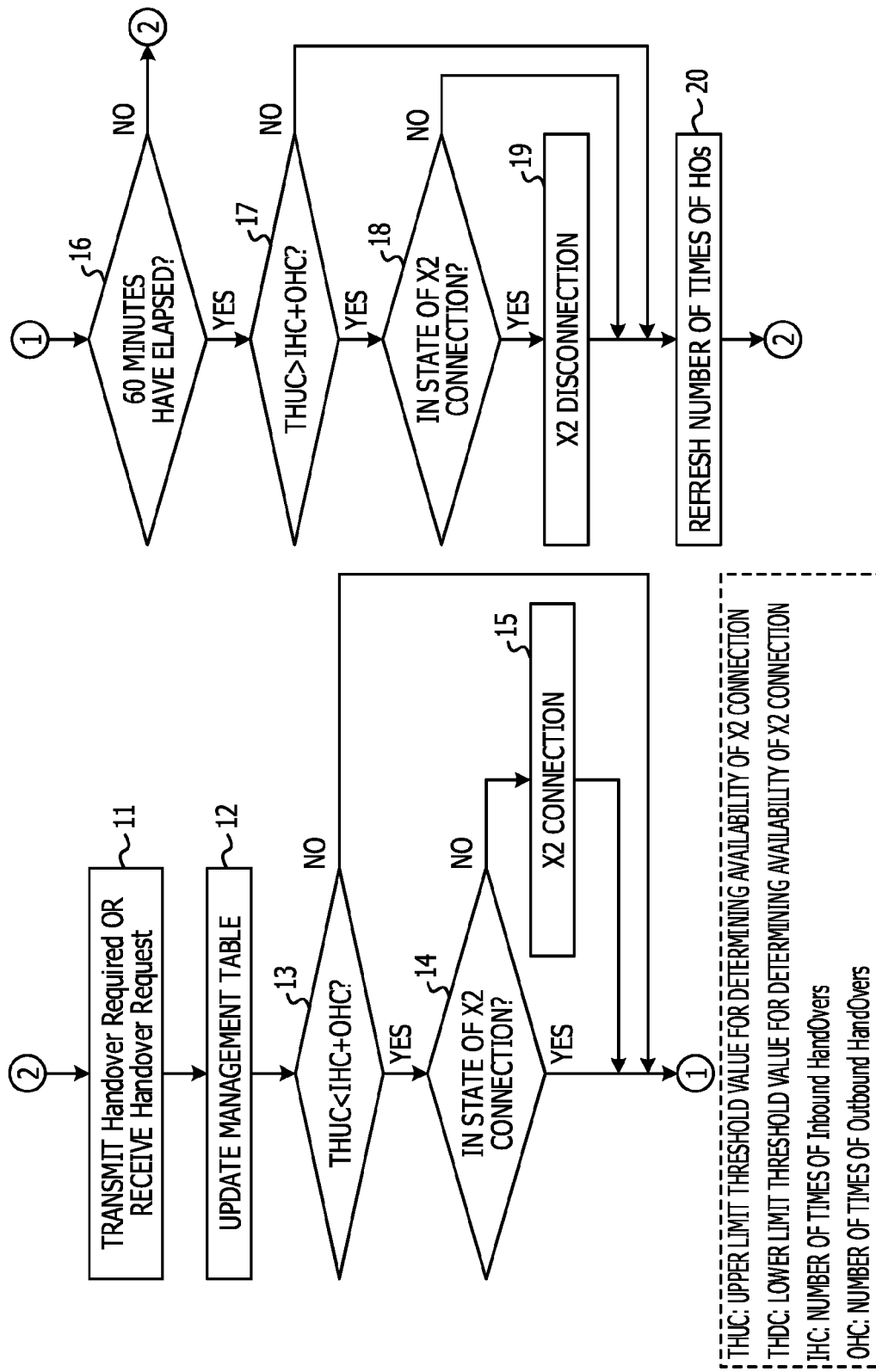
FIG. 10 is a flowchart illustrating an example of processing according to the second phase.

FIG. 10 is a flowchart illustrating an example of processing according to the second phase. The processing illustrated in FIG. 10 is performed by the CPU 13 (the management unit 27) in the corresponding base station 8. In a case of transmitting Handover Required or receiving Handover Request from an adjacent base station ("11"), each of the base stations 8 (the base stations 8*a* and 8*b* in the examples of FIG. 8 and FIG. 9A) counts up the number of times of HOs in an entry related to an adjacent base station (identified by the Global ENB ID) in the management table 30. The counting up is implemented every time a handover is generated.

The corresponding base station 8 calculates a handover frequency (the number of times of inbound handovers+the number of times of outbound handovers) ("13"). As determination threshold values, an upper limit threshold value (THUC: for example, 100 times) and a lower limit threshold value (THDC: for example, 50 times) are provided. The values of the upper limit threshold value and the lower limit threshold value may be arbitrarily set. In addition, one threshold value may be provided. The upper limit threshold value and the lower limit threshold value of the handover frequency are preliminarily stored in the auxiliary storage device 15.

In the processing operation in "13", the corresponding base station 8 determines whether or not the handover frequency (the number of times handovers are generated) exceeds the THU (reaches a value (a predetermined value) that exceeds the THU. In a case where the handover frequency exceeds the THU ("13": Yes), it is determined that the X2 connection is desirable. The corresponding base station 8 references the X2 connection determination value registered in an entry of the adjacent base station for which the X2 connection is determined to be desirable, and the corresponding base station 8 determines whether or not being in an X2 connection state ("14"). If the X2 connection determination value is "1 (in a state of a connection)", the processing proceeds to "16", and if the X2 connection determination value is "0 (in a state of no connection)", the processing proceeds to "15".

Figure 11:
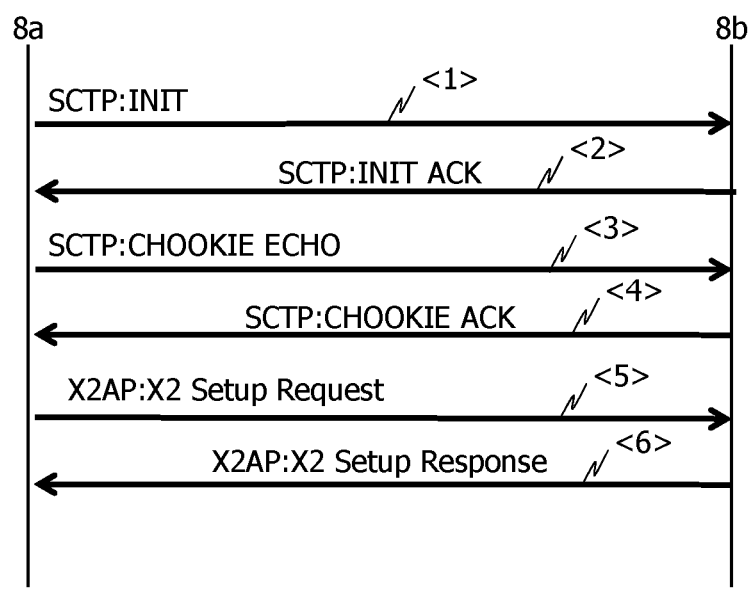
FIG. 11 is a sequence diagram illustrating a procedure of an X2 connection.

In a processing operation in "15", the X2 connection is performed. FIG. 11 is a sequence diagram illustrating a procedure of the X2 connection. The base stations 8*a* and 8*b* each support a stream control transmission protocol (SCTP), as a transport layer protocol. Each of the base stations 8*a* and 8*b* performs so-called message exchange in the SCTP, called four-way handshake, and establishes an SCTP connection (session) (<1> to <4> in FIG. 11).

The base station 8*a* sets, as a destination IP address of an SCTP message, the IP address of the base station 8*b*, stored in the management table 30, and sets, as a transmission source IP address, the address of the base station 8*a*, included in the self-station information 31. An INIT message of the SCTP, transmitted by the base station 8*a* to the base station 8*b* by the four-way handshake procedure, is an example of "a connection request for a connection".

After the establishment of the SCTP connection, the base station 8*a* transmits, to the base station 8*b*, a setting request message (X2 Setup Request) based on the X2AP (<5> in FIG. 11). Based on X2 Setup Request, the base station 8*b* performs a setting related to the X2 interface (the X2 line). In a case of finishing the setting, the base station 8*b* transmits a response message (X2 Setup Response) to the base station 8*a* (<6> in FIG. 11). In this way, the X2 connection (a connection in an X2AP layer between the base stations) is performed.

Returning to FIG. 10, the corresponding base station 8 counts, as the number of times of handovers, the handover frequency (the number of times of IHOs+the number of times of OHOs) in a predetermined time period (for example, 1 hour) and holds the handover frequency in the management table 30. If the predetermined time period has elapsed ("16": Yes), the corresponding base station 8 determines whether or not the handover frequency falls below the lower limit threshold value (THDC). The length of the predetermined time period may be arbitrarily set.

In a case where the handover frequency falls below the lower limit threshold value (THDC) ("17": Yes), the processing proceeds to "18", and otherwise ("17": No), the processing proceeds to "20". In a processing operation in "18", the corresponding base station 8 references the X2 connection determination value and determines whether or not being in an X2 connection state. At this time, in a case of not being in the X2 connection state ("1") ("18": No), the processing proceeds to "20". In contrast, in a case of being in the X2 connection state ("1") ("18": Yes), the processing proceeds to "19".

Figure 12:
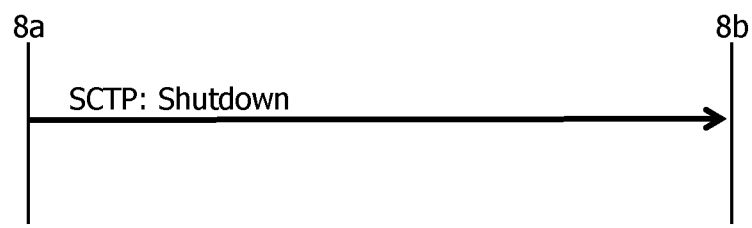
FIG. 12 is a sequence diagram illustrating X2 disconnection processing.

In a processing operation in "19", the corresponding base station 8 performs X2 disconnection processing operation. FIG. 12 is a sequence diagram illustrating the X2 disconnection processing. The base station 8*a* transmits, to the base station 8*b*, a disconnection message (Shutdown) for the SCTP connection. From this, the SCTP connection is disconnected, and the X2 connection is put into a disconnection state.

Returning to FIG. 10, in a processing operation in "20", the corresponding base station 8 refreshes (resets) the handover frequency and initiates counting again. After that, the processing returns to "11". In the X2 connection state, no S1 handover is implemented, and the X2 handover is implemented. Note that while, in the embodiment, the sum of the number of times of IHOs and the number of times of OHOs is used for the threshold value determination, one thereof may be used for the threshold value determination. In this case, a different threshold value may be prepared for each of IHO and OHO.

As described above, in the processing in FIG. 10, in a case where the handover frequency exceeds the upper limit threshold value, it is determined that a predetermined connection condition is satisfied, and in a case of not being in the X2 connection state, the connection request (INIT message) is transmitted, thereby preforming the X2 connection.

<X2 Handover>

Figure 13:
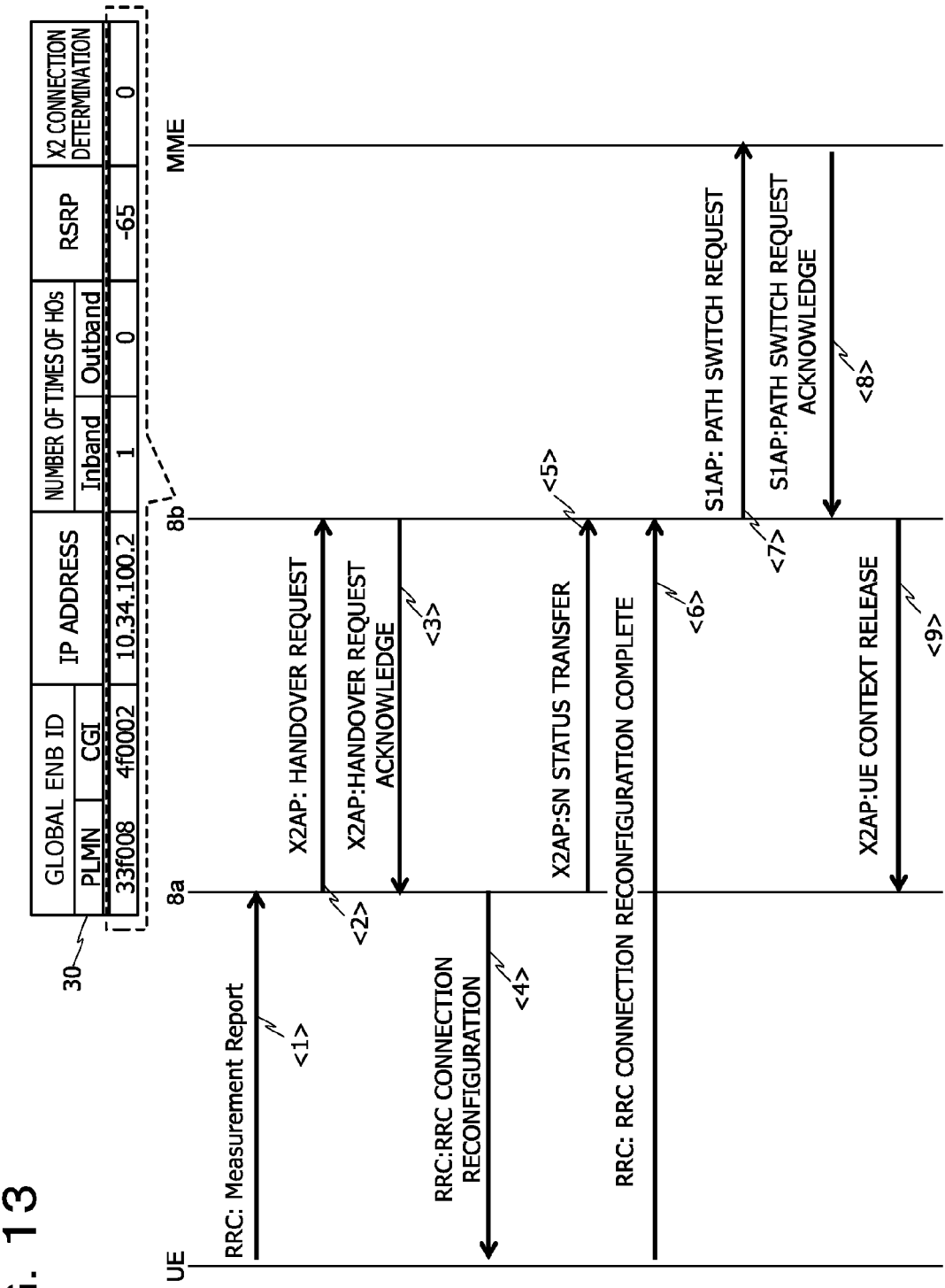
FIG. 13 is a sequence diagram illustrating an example of a procedure of an X2 handover.

FIG. 13 is a sequence diagram illustrating an example of a procedure of the X2 handover. In FIG. 13, if the RSRP of the base station 8a is decreased and the RSRP of the base station 8b is increased, the corresponding terminal 11 (UE) under control of the base station 8a transmits Measurement Report to the base station 8a (<1> in FIG. 13). Then, the base station 8a (a source base station) transmits, to the base station 8b (a target base station), a handover request message (X2AP: Handover Request) in the X2AP layer (<2> in FIG. 13).

The base station 8b performs processing based on Handover Request and transmits, to the base station 8a, a response message (X2AP: Handover Request Acknowledge) (<3> in FIG. 13). Then, the base station 8a transmits, to the corresponding terminal 11, a message (Connection Reconfiguration) for requesting to change a wireless link (to a wireless connection with the base station 8b) (<4> in FIG. 13). Subsequently, the base station 8a notifies the base station 8b of a sequence number (SN) state (<5> in FIG. 13).

After that, if a wireless connection between the corresponding terminal 11 and the base station 8b is completed, a completion message (Connection Reconfiguration Complete) is transmitted to the base station 8b (<6> in FIG. 13). Then, the base station 8b transmits, to the MME 3, a message (S1AP: Path Switch Request) in an S1AP layer, used for requesting to change a path (bearer) set between the base station 8a and the S-GW 4 to a path between the base station 8b and the S-GW 4 (<7> in FIG. 13).

The MME 3 controls the operation of the S-GW 4 in accordance with the message and performs a renewal of a path (bearer). If the renewal is completed, the MME 3 transmits, to the base station 8b, a completion message (Path Switch Request Acknowledge) (<8> in FIG. 13). The base station 8b transmits, to the base station 8a, a message (UE Context Release) indicating completion of the X2 handover (<9> in FIG. 13). The base station 8a releases context information related to the corresponding terminal 11 and terminates the X2 handover. In this way, the base station 8a and the base station 8b are able to perform the X2 handover by using the X2 connection.

Second Example of Operation

The management table 30 manages the RSRP of an adjacent cell (an adjacent base station). In a case where the corresponding terminal 11 is in a communication state, the corresponding base station 8 periodically transmits, for example, rrc Connection Reconfiguraiton and implements information acquisition based on Measurement Report from the corresponding terminal 11. In addition, the corresponding base station 8 may obtain information even by using Measurement Report at the time of generation of a handover. By using the obtained information of the RSRP, the corresponding base station 8 calculates the moving average value of the RSRP and updates the RSRP value of the management table 30.

Figure 14:
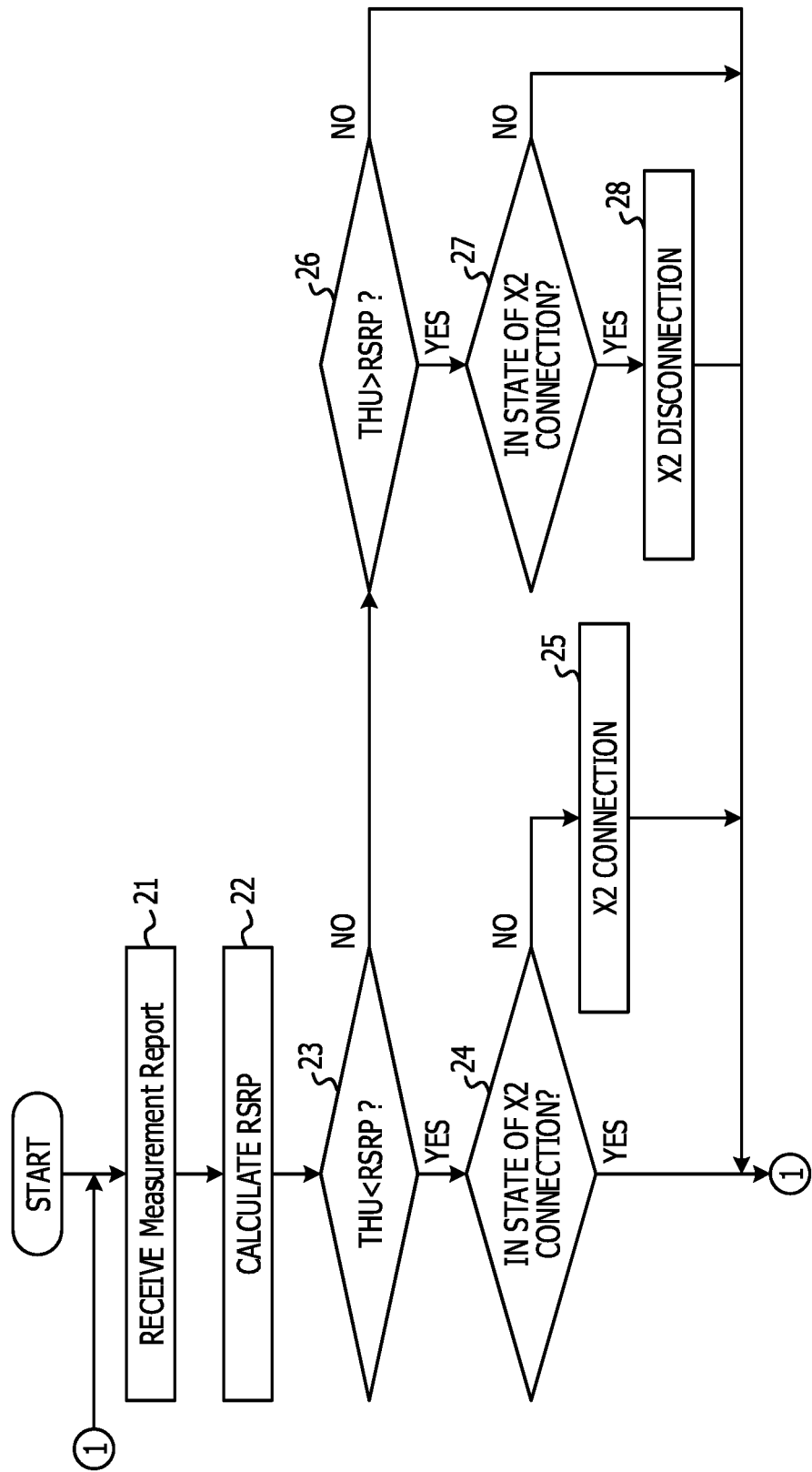
FIG. 14 is a flowchart illustrating an example of processing in a second example of an operation.

FIG. 14 is a flowchart illustrating an example of processing in the second example of an operation. The processing in FIG. 14 is performed by the CPU 13 (the management unit 27) in the corresponding base station 8. In the example of FIG. 14, it is assumed that the IP addresses of respective adjacent base stations are registered in the management table 30.

In a case of receiving Measurement Report in a processing operation in "21", the corresponding base station 8 searches, within the management table 30, for an entry of an adjacent base station identified by Measurement Report and calculates the moving average of the RSRP value thereof, thereby updating the RSRP value ("22").

Next, the corresponding base station 8 determines whether or not the updated RSRP value exceeds the predetermined upper limit threshold value (THUR: for example, −70 dB). In a case where the RSRP value exceeds the upper limit threshold value ("23": Yes), the processing proceeds to "24", and otherwise ("23": No), the processing proceeds to "26". Note that the upper limit threshold value and the lower limit threshold value (THDR: a threshold value for disconnection), used for determining the RSRP, are preliminarily stored in the auxiliary storage device 15. The same value may be used as the upper limit threshold value and the lower limit threshold value.

In "24", the corresponding base station 8 determines whether or not being in the X2 connection state, and in a case of being in the X2 connection state ("24": Yes), the corresponding base station 8 returns the processing to "21". In contrast, in a case of not being in the X2 connection state ("24": No), the corresponding base station 8 performs, in a processing operation in "25", the X2 connection with the corresponding adjacent base station (see FIG. 11). After that, the processing returns to "21".

In a case where the processing proceeds to "26", the corresponding base station 8 determines whether or not the RSRP value falls below the predetermined lower limit threshold value (THDR: for example, −100 dB). If the RSRP value is greater than or equal to the lower limit threshold value ("26": No), the processing returns to "21". In contrast, in a case where the RSRP value falls below the lower limit threshold value ("26": Yes), the corresponding base station 8 determines whether or not being in the X2 connection state ("27"). At this time, in a case of being in the X2 connection state ("27": Yes), the corresponding base station 8 performs disconnection processing for the X2 connection (see FIG. 12). In contrast, in a case of not being in the X2 connection state ("27": No), the processing returns to "21". In this way, it is possible to perform the X2 connection and a disconnection, based on the RSRP value.

As described above, in the processing in the FIG. 14, in a case where the RSRP value exceeds the upper limit threshold value, it is determined that a predetermined connection condition is satisfied, and in a case of not being in the X2 connection state, the connection request (INIT message) is transmitted, thereby performing the X2 connection.

Third Example of Operation

Figure 15:
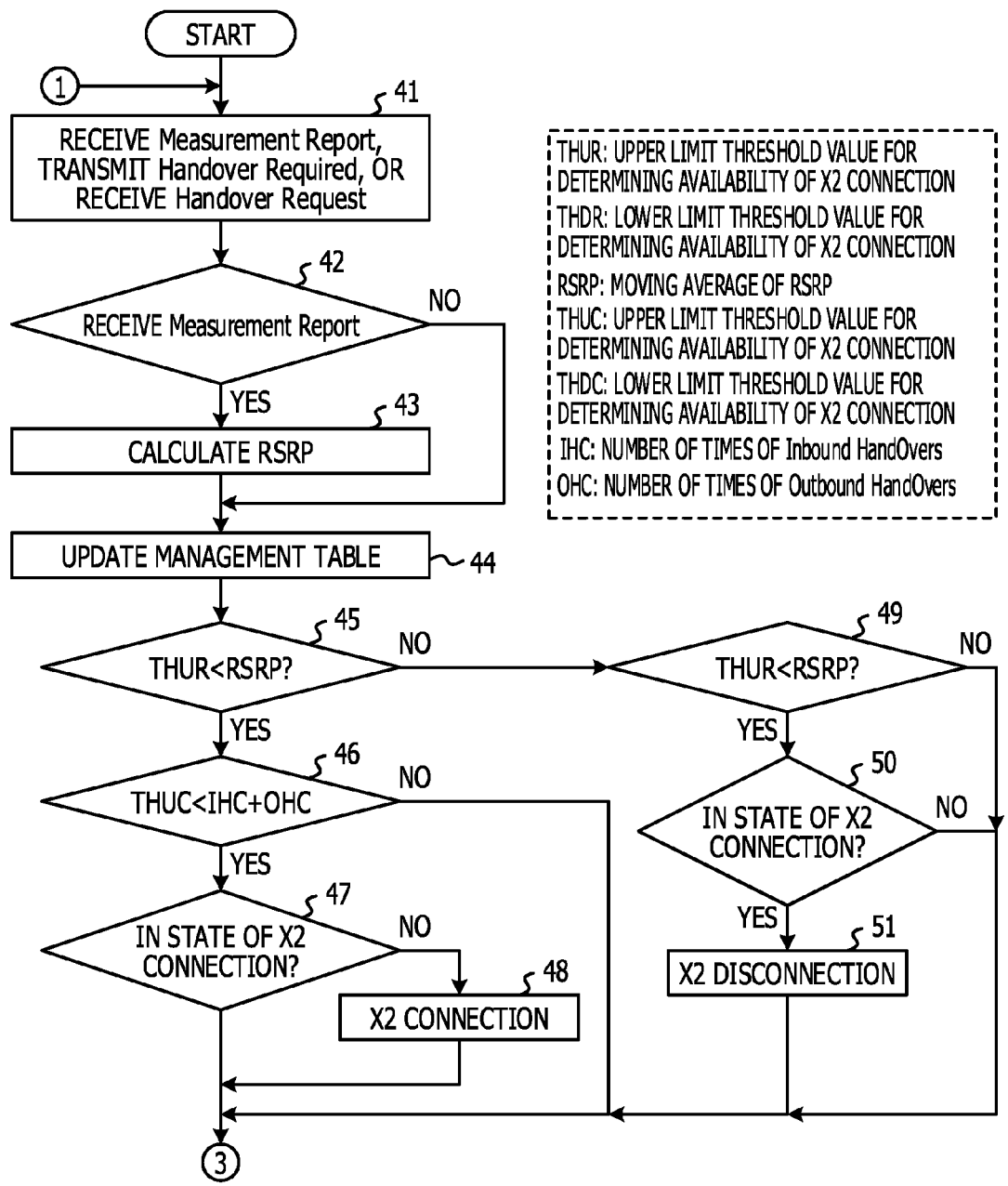
FIG. 15 is a flowchart illustrating an example of processing of a third example of an operation.
Figure 16:
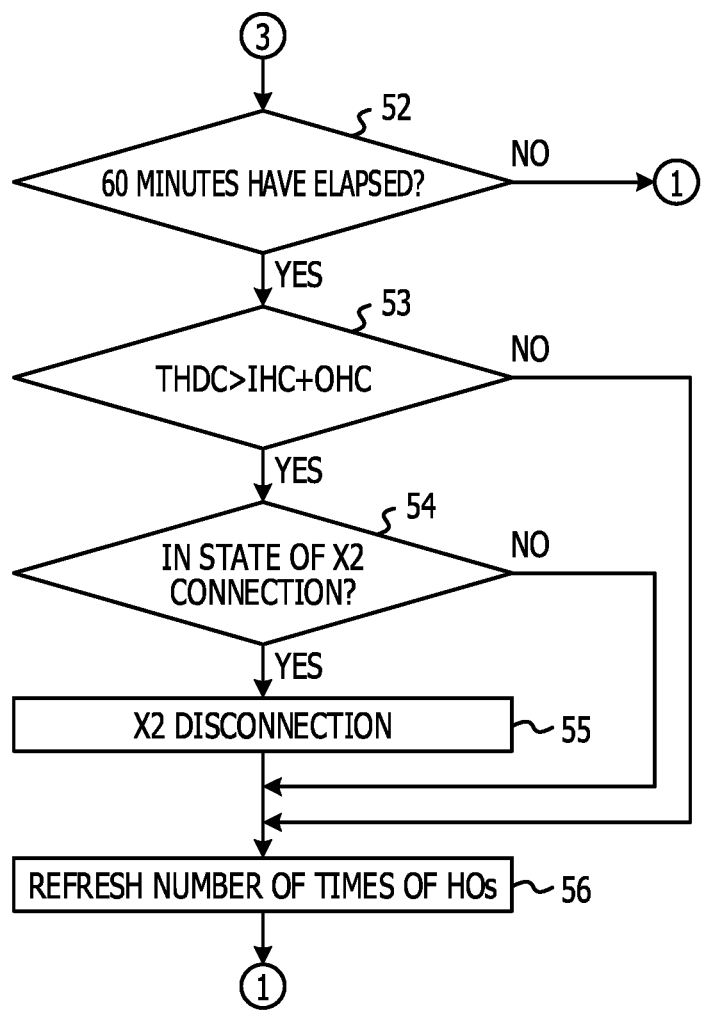
FIG. 16 is a flowchart illustrating an example of processing of the third example of an operation.

FIG. 15 and FIG. 16 are flowcharts illustrating an example of processing of a third example of an operation. In the third example of an operation, both the HO frequency and the RSRP value are used for determining whether or not the X2 connection is desirable. Processing operations in FIG. 15 and FIG. 16 are performed by the CPU 13 (the management unit 27) in the corresponding base station 8.

In a processing operation in "41", in a case of receiving Measurement Report, receiving Handover Request, or transmitting Handover Required, the corresponding base station 8 determines whether or not Measurement Report is received. In a case of reception of Measurement Report, the corresponding base station 8 searches for a corresponding entry within the management table 30 and calculates the moving average of the RSRP related to the searched entry ("43"), thereby registering the moving average in the relevant entry ("44").

In a case where the RSRP value of the corresponding entry exceeds the upper limit threshold value (THUR) of the RSRP value ("45": Yes) and the HO frequency exceeds the upper limit threshold value (THUC) of the HO frequency ("46": Yes), the corresponding base station 8 determines whether or not being in the X2 connection state ("47"). At this time, in a case of being in the X2 connection state (47: Yes), the processing returns to "41". In contrast, in a case of not being in the X2 connection state ("47": No), the X2 connection is performed ("48").

On the other hand, in a case where the RSRP value does not exceed the upper limit threshold value ("45": No), the processing proceeds to "49", and in a case where the HO frequency does not exceed the upper limit threshold value ("46": No), the processing returns to "41". Since processing operations in "49" to "51" are the same as the respective processing operations in "26" to "28" illustrated in FIG. 14, the descriptions thereof will be omitted. In a case where determination of NO is performed in "49" or "50" or in a case where the processing operation in "51" finishes, the processing proceeds to "52". Since processing operation in "52" to "56" are the same as the respective processing operations in "16" to "20" illustrated in FIG. 10, the descriptions thereof will be omitted. Note that in a case where determination of NO is performed in "52" or in a case where a processing operation in "56" finishes, the processing returns to "41".

Fourth Example of Operation

Figure 17A:
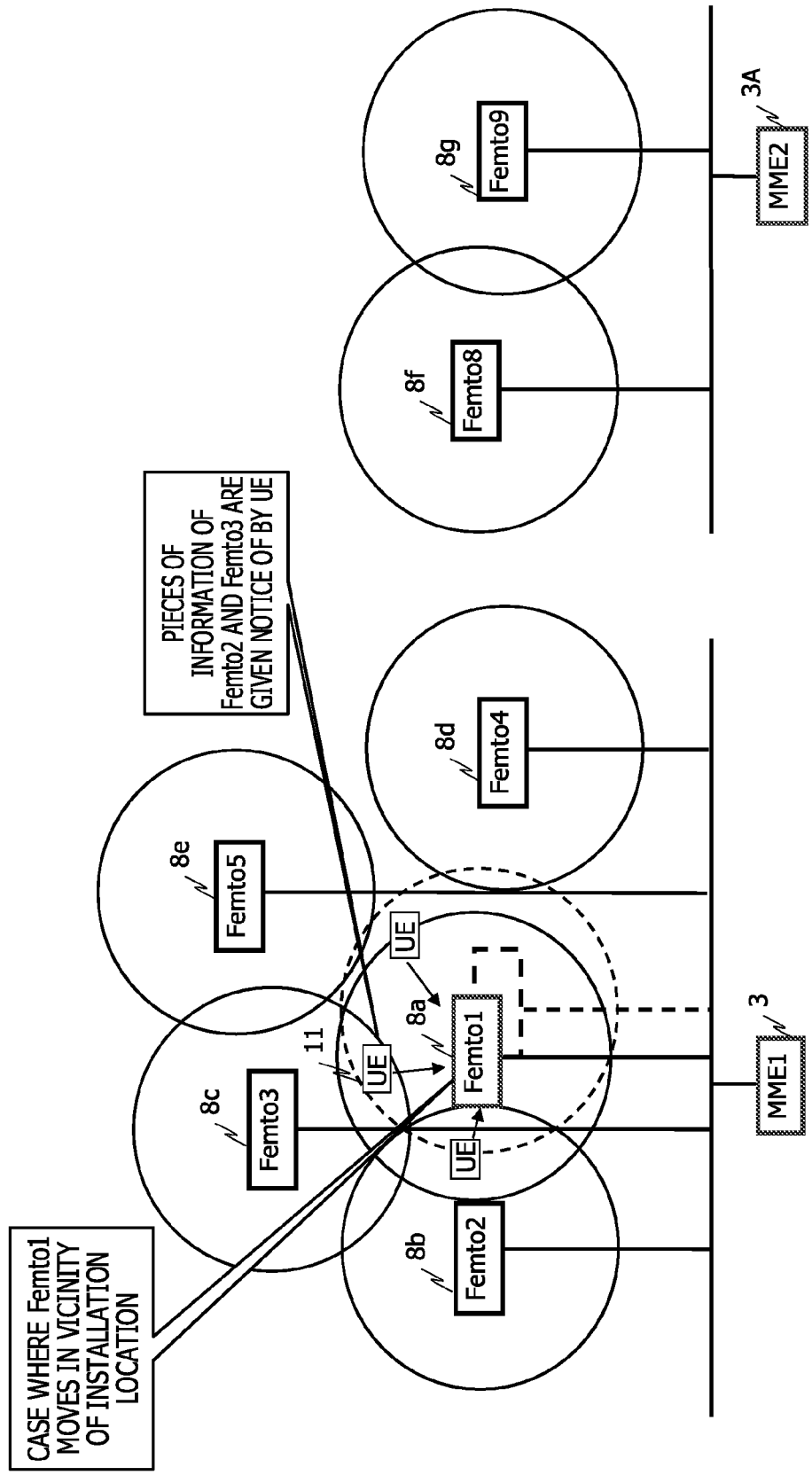
FIGS. 17A and 17B are an explanatory diagram of a fourth example of an operation and illustrate a case where a base station moves to the vicinity of a current installation location.
Figure 17B:
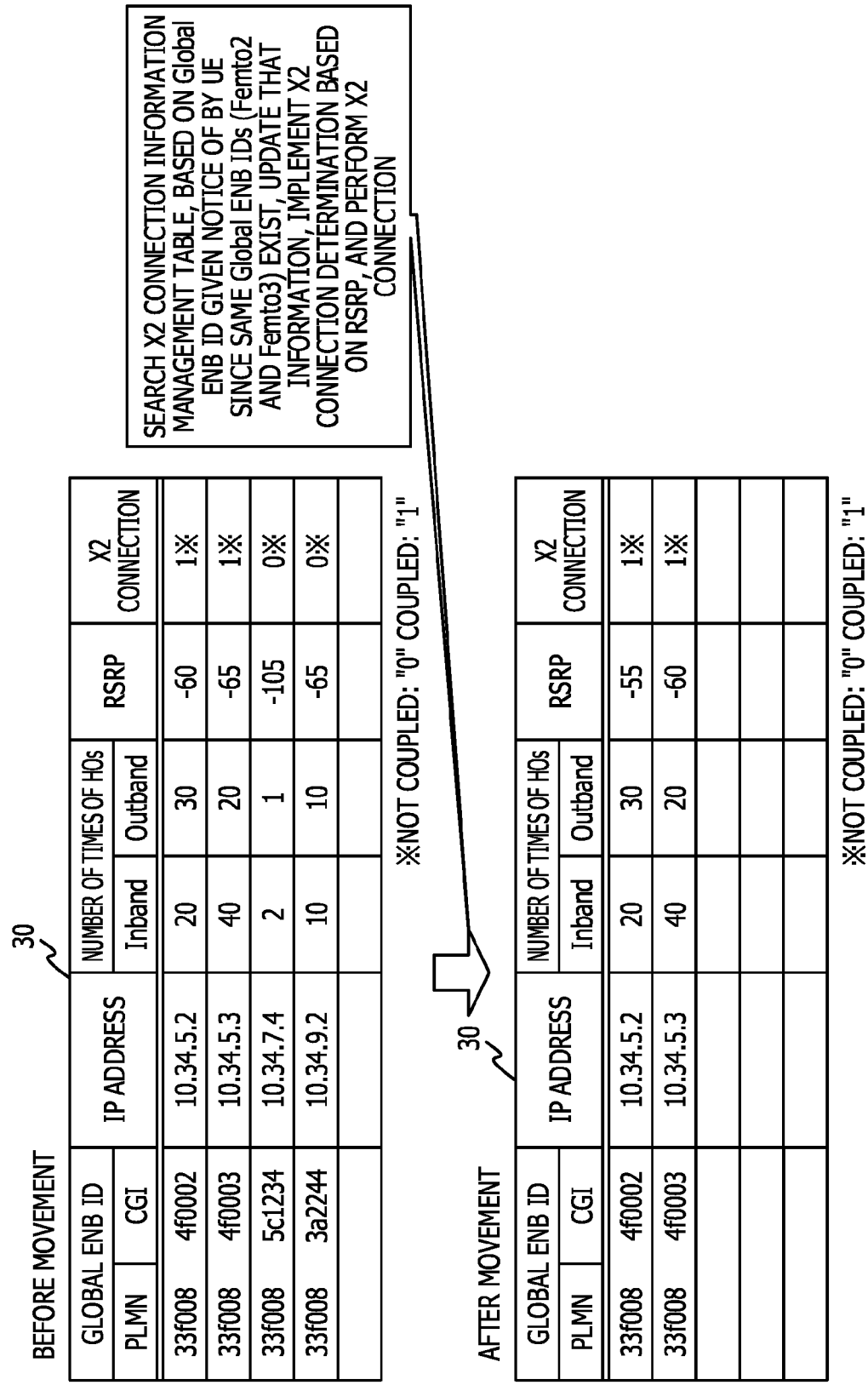

As described above, the base stations 8 each have portability, and installation locations thereof are changed as appropriate. FIGS. 17A and 17B are explanatory diagrams of a fourth example of an operation and illustrate a case where the base station 8a moves to the vicinity of a current installation location. The movement causes the cell of each of the base station 8d and the base station 8e not to be adjacent to the cell of the base station 8a, and it is difficult to implement a handover between the base station 8a and each of the base station 8d and the base station 8e.

At the time of the movement of the base station 8a, even if the power supply of the base station 8a is turned off, the management table 30 is saved in the auxiliary storage device 15 (a non-volatile storage medium). Therefore, the registration content of the management table 30 is maintained.

It is assumed that the power supply of the base station 8a is turned on after the movement and the terminals 11 are coupled to the base station 8a and maintain communication states. In this case, the base station 8a transmits a transmission request message to the terminals 11, thereby prompting to transmit Measurement Report, and receives Measurement Report from each of the terminals 11. The movement of the base station 8a causes a state in which pieces of information of the base stations 8b and 8c are obtained from Measurement Reports of the respective terminals 11 and information of the base station 8d or 8e is not obtained.

The base station 8a deploys, in the main storage device 14, the management table 30 before the movement, saved in the auxiliary storage device 15, and determines whether or not the Global ENB ID obtained from Measurement Report from each of the terminals 11 is registered in the management table 30. At this time, the entries of the base stations 8b and 8c are registered. Accordingly, the base station 8a decides to continue using the entries of the base stations 8b and 8c and performs, on each of these base stations 8b and 8c, threshold value determination by using the RSRP value. At this time, in a case where the RSRP value exceeds the threshold value, the X2 connection is performed. In contrast, the base station 8a deletes, from the management table 30, entries of the base stations 8d and 8e whose Global ENB IDs are not obtained from Measurement Reports from the respective terminals 11.

Figure 18A:
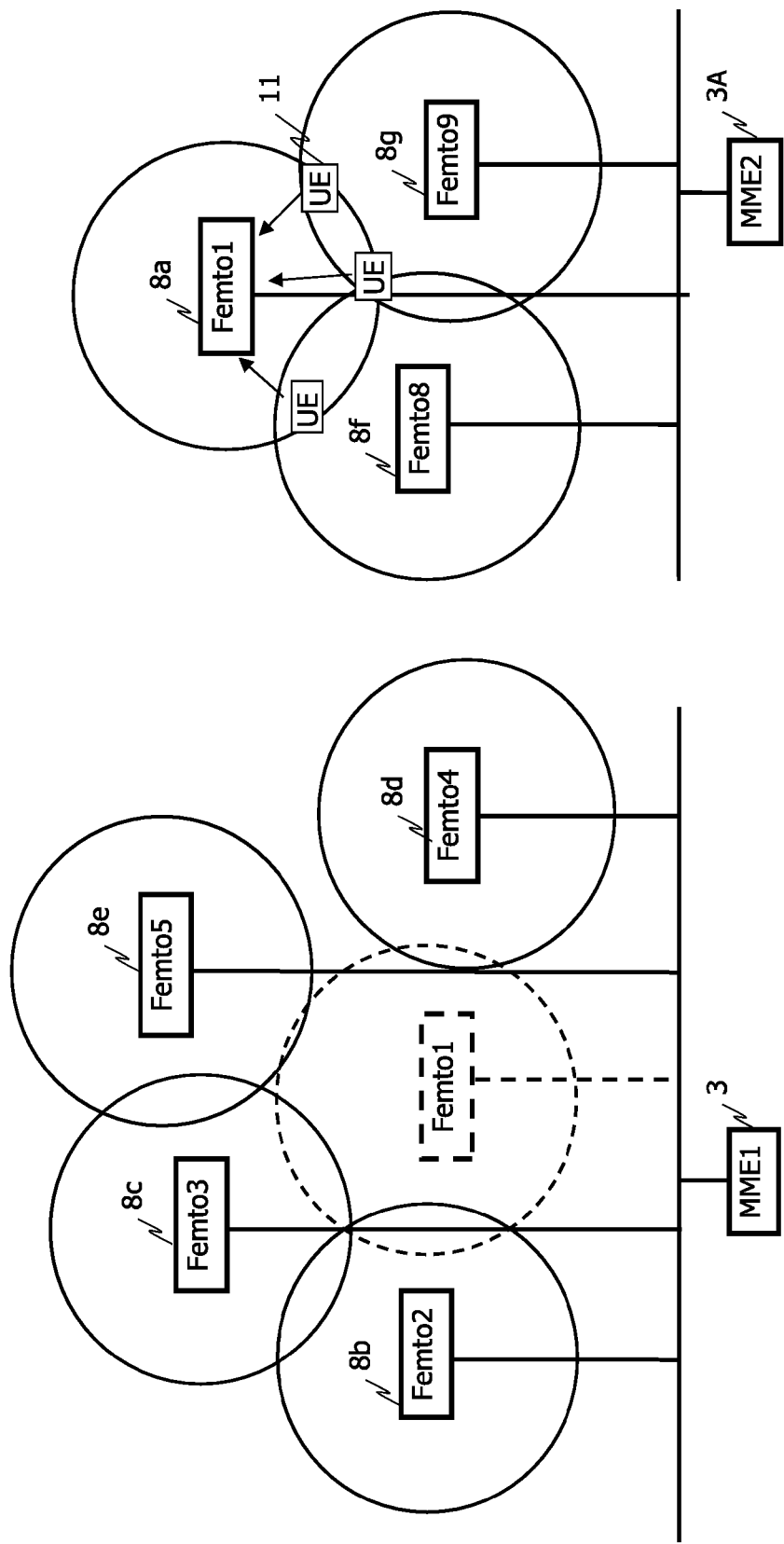

FIGS. 18A and 18B are explanatory diagrams of the fourth example of an operation and illustrate a case where the base station 8a moves from the current location to a location far away therefrom. In the example of FIGS. 18A and 18B, adjacent base stations of the base station 8a are changed from the base stations 8b to 8e to base stations 8f and 8g. It is assumed that the power supply of the base station 8a is turned on after the movement and the terminals 11 are coupled to the base station 8a and maintain communication states. In this case, the base station 8a transmits a transmission request message to the terminals 11 and receives Measurement Report from each of the terminals 11. From this, instead of obtaining no information of the adjacent base stations 8b to 8e before the movement, the base station 8a is put into a state of obtaining pieces of information of the base stations 8f and 8g.

In this case, in confirmation (check) of the registration content of the management table 30, it is determined that there is no entry corresponding to the Global ENB ID obtained from Measurement Report of each of the terminals 11. Therefore, the base station 8a (the CPU 13) performs refreshing of the management table 30 (deletion of all entries) and newly creates the management table 30 by using the pieces of information of the adjacent base stations, obtained in this case. As the pieces of information of the base stations 8f and 8g, there are only the Global ENB IDs and the RSRPs obtained from Measurement Reports. Therefore, while a handover with each of the base station 8f and the base station 8g serves as a trigger, the base station 8a determines, at the time of being able to acquire the IP address thereof, whether or not the X2 connection is desirable, and the base station 8a implements the X2 connection in accordance with a determination result.

Advantages of Embodiment

According to the embodiment, in accordance with the environment of installation locations of base stations and an environmental change associated with the passage of time, it is possible to determine whether or not the X2 connection with an adjacent base station is desirable, and it is possible to establish the X2 connection state with a suitable adjacent base station. An IP address used for the X2 connection is transmitted to a target base station by a source base station by using a message for the S1 handover. Therefore, it is possible to avoid newly providing a message or a protocol, used for transmitting the IP address. In other words, it is possible to reduce a development scale and the number of man-hours for development.

In addition, the IP address is included as optional information of the UE history information transmitted between base stations. Since the UE history information includes the Global ENB ID serving as an identifier of a base station, it becomes easy to search within the management table 30 and to register the IP address.

In addition, in a case where, after movement of the corresponding base station 8, information from an adjacent base station before the movement is obtained, to continue using an entry related to the relevant adjacent base station is decided. From this, as for the relevant adjacent base station, without waiting for a handover trigger after the movement, it is possible to perform determination of whether or not the X2 connection is desirable. In addition, an entry related to the corresponding base station 8 whose information becomes difficult to obtain from the corresponding terminal 11 after the movement is deleted from the management table 30. Accordingly, it is possible to set the registration content of the management table 30 to a content matched with the surrounding environment of the corresponding base station 8. The above-mentioned configurations of the embodiment may be arbitrarily combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system comprising:
   a control device;
   a first base station; and
   a second base station, wherein
   the first base station and the second base station are configured to execute a first handover process in which the first base station and the second base station execute handover between the first base station and the second base station through the control device, and after the first handover process, the first base station and the second base station are configured to execute a second handover process between the first base station and the second base station in which the first base station and the second base station execute the handover without involving the control device,
   the first base station includes a first memory and a first processor coupled to the first memory and configured to transmit address information of the first base station to the control device when the first base station executes the first handover process to the second base station,
   the control device is configured to transmit the address information of the first base station to the second base station in the first handover process,
   the second base station includes:
     a second memory configured to store the received address information of the first base station, and
     a second processor coupled to the second memory and configured to transmit a connection request, without involving the control device, to the first base station based on the received address information of the first base station, and
   the first base station is configured to establish, without involving the control device, a connection for the second handover process between the first base station and the second base station in response to the connection request.

2. The communication system according to claim 1, wherein
   the first base station includes a first femto base station having portability, and
   the second base station includes a second femto base station having portability.

3. The communication system according to claim 1, wherein
   the first base station transmits, to the control device, a handover request which requires the second base station to execute the first handover process, and
   the handover request includes the address information of the first base station.

4. The communication system according to claim 1, wherein the second processor is configured to
   transmit the connection request when a number of times the first handover process between the first base station and the second base station is generated in a certain time period reaches a predetermined value in a state in which the connection for the second handover process is not established.

5. The communication system according to claim 1, wherein the second processor is configured to
   transmit the connection request when a reception level of a radio wave received from the second base station by a terminal under control of the first base station exceeds a threshold value in a state in which the connection for the second handover process is not established.

6. The communication system according to claim 1, wherein the second processor is configured to
   transmit the connection request when, in a state in which the connection for the second handover process is not established, a number of times the first handover process between the first base station and the second base station is generated in a predetermined time period reaches a predetermined value and a reception level of a radio wave received from the second base station by a terminal under control of the first base station exceeds a threshold value.

7. The communication system according to claim 1, wherein the second processor is configured to
   perform disconnection processing for the connection for the second handover process when a predetermined disconnection condition is satisfied in a state in which the connection for the second handover process is established.

8. The communication system according to claim 7, wherein the second processor is configured to
   perform the disconnection processing when the number of times handovers between the first base station and the second base station are generated in a predetermined time period falls below a threshold value for a disconnection in a state in which the connection for the second handover process is established.

9. The communication system according to claim 7, wherein the second processor is configured to
   perform the disconnection processing when a reception level of a radio wave received from the second base station by a terminal under control of the first base station falls below a threshold value for a disconnection in a state in which the connection for the second handover process is established.

10. The communication system according to claim 7, wherein the second processor is configured to
    perform the disconnection processing when, in a state in which the connection is established, a number of times handovers between the first base station and the second base station are generated in a predetermined time period falls below a threshold value for a disconnection and a reception level of a radio wave received from the second base station by a terminal under control of the first base station falls below a threshold value for a disconnection.

11. The communication system according to claim 7, wherein the second memory is configured to
store therein the address information of the first base station, an identifier of the first base station, and a value used for determining whether the connection condition is satisfied while associating, with one another, the address information of the first base station, the identifier of the first base station, and the value used for determining whether connection condition is satisfied, and
the second processor is configured to
determine whether the connection condition is satisfied, by using the value stored in the second memory while being associated with the identifier of the first base station, when the identifier of the first base station is received from a terminal after the second base station moves.

12. The communication system according to claim 1, wherein
the first handover process is an S1 handover process, and
the second handover process is an X2 handover process.

13. A method of handover using a control device, a first base station, and a second base station, the method comprising:
transmitting, by the first base station, address information of the first base station to the control device when the first base station and the second base station executes handover between the first base station and the second base station through the control device;
transmitting, by the control device, the address information of the first base station to the second base station;
storing, in the second base station, the received address information of the first base station;
transmitting, by the second base station, a connection requirement to the first base station, without involving the control device, based on the received address information of the first base station; and
establishing, in response to the connection requirement, a connection which is used for the handover between the first base station and the second base station without involving the control device.

14. The method according to claim 13, wherein
the first base station includes a first femto base station having portability, and
the second base station includes a second femto base station having portability.

15. The method according to claim 13, further comprising:
transmitting, by the first base station, to the control device, a handover request which requires the second base station to execute the first handover process, wherein
the handover request includes the address information of the first base station.

16. The method according to claim 13, wherein
the first handover process is an S1 handover process, and
the second handover process is an X2 handover process.

17. A base station comprising:
a memory; and
a processor coupled to the memory and configured to:
execute a first handover process in which the base station and other base station execute handover between the base station and the other base station through a control device, and
after the first handover process, execute a second handover process in which the base station and the other base station execute the handover between the base station and the other base station without involving the control device,
wherein the processor is further configured to:
in the first handover process, transmit address information of the base station to the second base station through the control device,
receive a connection requirement from the other base station, without involving the control device, the connection requirement is generated by the other base station based on the address information transmitted to the other base station in the first handover process, and
establish, without involving the control device, in response to the connection requirement, a connection for the second handover process between the base station and the other base station.

18. The base station according to claim 17, wherein
the base station includes a first femto base station having portability, and
the other base station includes a second femto base station having portability.

19. The base station according to claim 17, wherein
in transmitting the address information, the base station transmits, to the control device, a handover request which requires the other base station to execute the first handover process, wherein
the handover request includes the address information of the base station.

20. The base station according to claim 17, wherein
the first handover process is an S1 handover process, and
the second handover process is an X2 handover process.

* * * * *